United States Patent
Blasco Serrano et al.

(10) Patent No.: US 10,681,724 B2
(45) Date of Patent: Jun. 9, 2020

(54) METHODS PROVIDING SCHEDULING FOR SIDELINK COMMUNICATIONS AND RELATED WIRELESS TERMINALS AND NETWORK NODES

(71) Applicant: Telefonaktiebolaget LM Ericsson (publ), Stockholm (SE)

(72) Inventors: Ricardo Blasco Serrano, Espoo (FI); Hieu Do, Järfälla (SE); Stefano Sorrentino, Solna (SE); Wanlu Sun, Solna (SE)

(73) Assignee: Telefonaktiebolaget LM Ericcson (publ), Stockholm (SE)

( * ) Notice: Subject to any disclaimer, the term of this patent is extended or adjusted under 35 U.S.C. 154(b) by 0 days.

(21) Appl. No.: 15/770,542

(22) PCT Filed: Mar. 14, 2018

(86) PCT No.: PCT/SE2018/050245
§ 371 (c)(1),
(2) Date: Apr. 24, 2018

(87) PCT Pub. No.: WO2018/174779
PCT Pub. Date: Sep. 27, 2018

(65) Prior Publication Data
US 2019/0289627 A1    Sep. 19, 2019

Related U.S. Application Data

(60) Provisional application No. 62/476,100, filed on Mar. 24, 2017.

(51) Int. Cl.
H04W 72/14       (2009.01)
H04W 76/14       (2018.01)
(Continued)

(52) U.S. Cl.
CPC ............ *H04W 72/14* (2013.01); *H04W 4/46* (2018.02); *H04W 24/10* (2013.01); *H04W 56/00* (2013.01);
(Continued)

(58) Field of Classification Search
None
See application file for complete search history.

(56) References Cited

U.S. PATENT DOCUMENTS

2017/0019887 A1* 1/2017 Jiang ................. H04W 72/042
2017/0134080 A1* 5/2017 Rahman .............. H04B 7/0456
(Continued)

FOREIGN PATENT DOCUMENTS

WO    WO 2018/031180 A1    2/2018

OTHER PUBLICATIONS

LG Electronics, Discussion on sidelink subframe timing and number determination, May 23-27, 2016, 3 Pages (R1-164521) 3GPP TSG RAN WG1 Meeting #85, Nanjing, China.
(Continued)

*Primary Examiner* — Edan Orgad
*Assistant Examiner* — Emmanuel K Maglo
(74) *Attorney, Agent, or Firm* — Sage Patent Group

(57) ABSTRACT

The disclosure relates to methods of operating a first wireless terminal providing network communication with a radio access network using a network carrier and providing sidelink communications using a sidelink carrier. A scheduling grant may be received from the radio access network using a network subframe of the network carrier. First and second time measurements relating to the sidelink carrier and the network carrier respectively may be obtained. Responsive to the scheduling grant, the first time measurement, and the
(Continued)

second time measurement, a communication sidelink subframe of the sidelink carrier may be selected to be used for a sidelink communication.

21 Claims, 9 Drawing Sheets

(51) Int. Cl.
    *H04W 4/46*     (2018.01)
    *H04W 24/10*     (2009.01)
    *H04W 72/04*     (2009.01)
    *H04W 72/12*     (2009.01)
    *H04W 56/00*     (2009.01)

(52) U.S. Cl.
    CPC ..... *H04W 72/042* (2013.01); *H04W 72/0446* (2013.01); *H04W 72/0453* (2013.01); *H04W 72/12* (2013.01); *H04W 76/14* (2018.02); *H04W 56/0015* (2013.01)

(56) References Cited

U.S. PATENT DOCUMENTS

| | | | |
|---|---|---|---|
| 2017/0332207 A1* | 11/2017 | Sheng | H04W 4/027 |
| 2017/0353819 A1* | 12/2017 | Yin | H04L 47/30 |
| 2018/0049235 A1* | 2/2018 | Baghel | H04W 4/70 |
| 2018/0069618 A1* | 3/2018 | Loehr | H04B 7/15542 |
| 2018/0092067 A1* | 3/2018 | Liu | H04W 76/14 |

OTHER PUBLICATIONS

Qualcomm Incorporated, Coexistence of PC5 and Uu for V2V, Aug. 22-26, 2016, 3 Pages (R1-166263) 3GPP TSG-RAN WG1 #86, Gothenburg, Sweden.

Ericsson, Corrections to Mode 3 scheduling, Apr. 3-7, 2017, 4 Pages (R1-1705818) 3GPP TSG RAN WG1 Meeting #88bis, Spokane, USA.

International Search Report, dated May 23, 2018, 5 Pages, PCT/SE2018/050245.

* cited by examiner

V2X Scenarios For An LTE-based NW

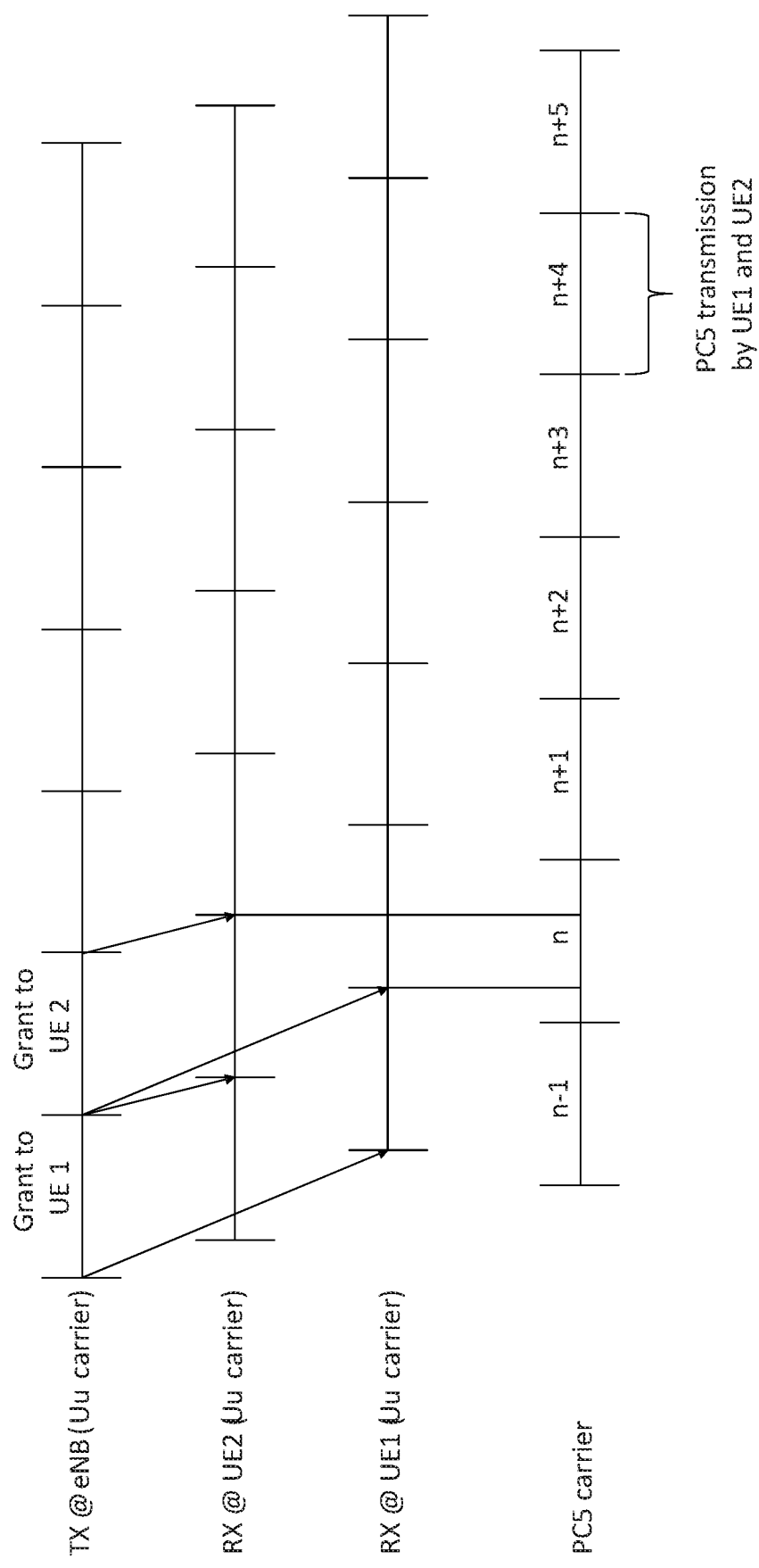

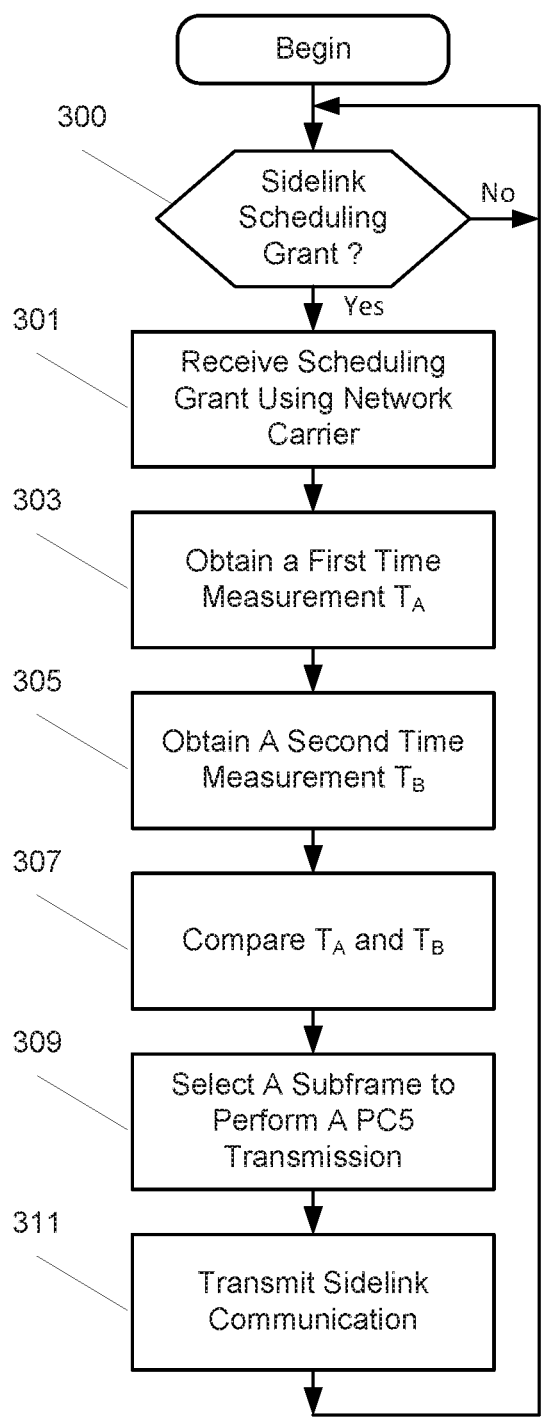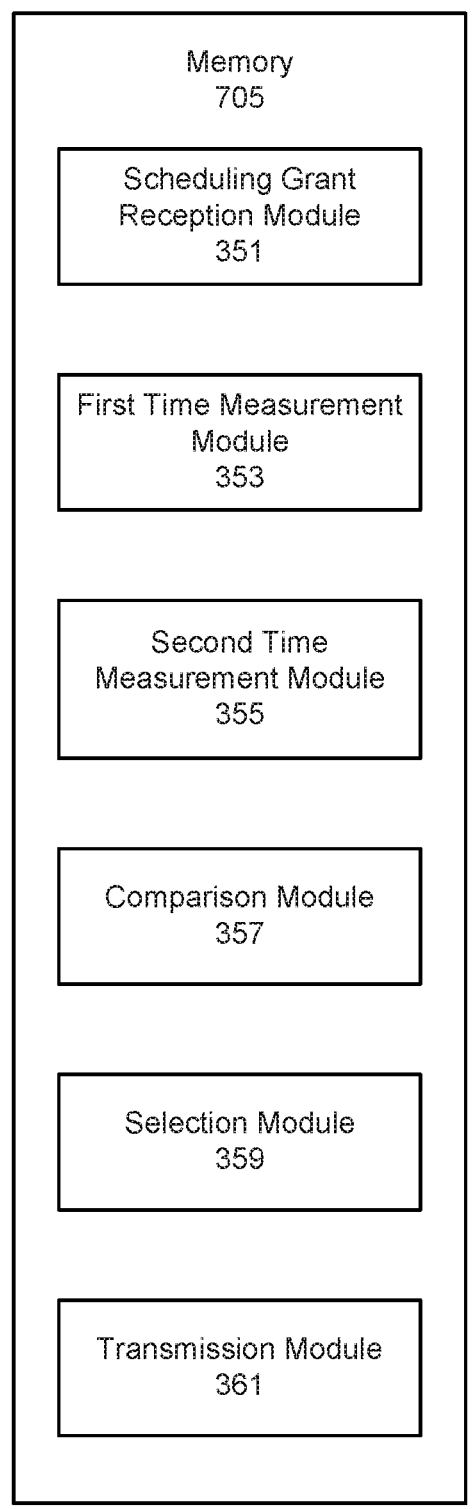

Figure 4A
Diagram of the method in Network Node
Figure 4B
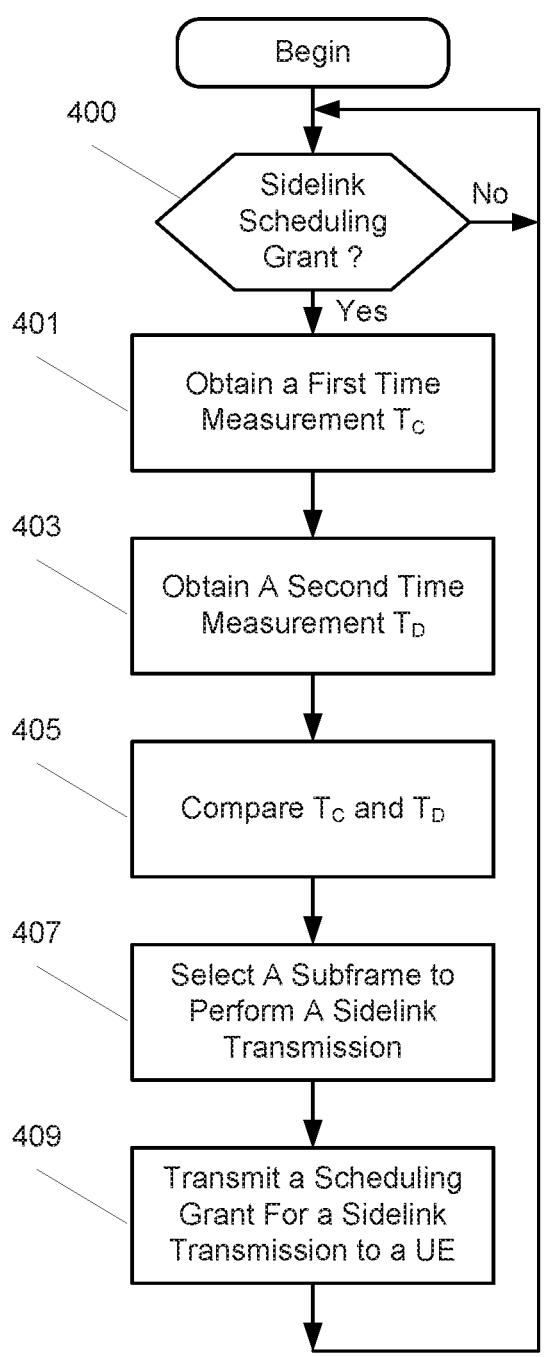
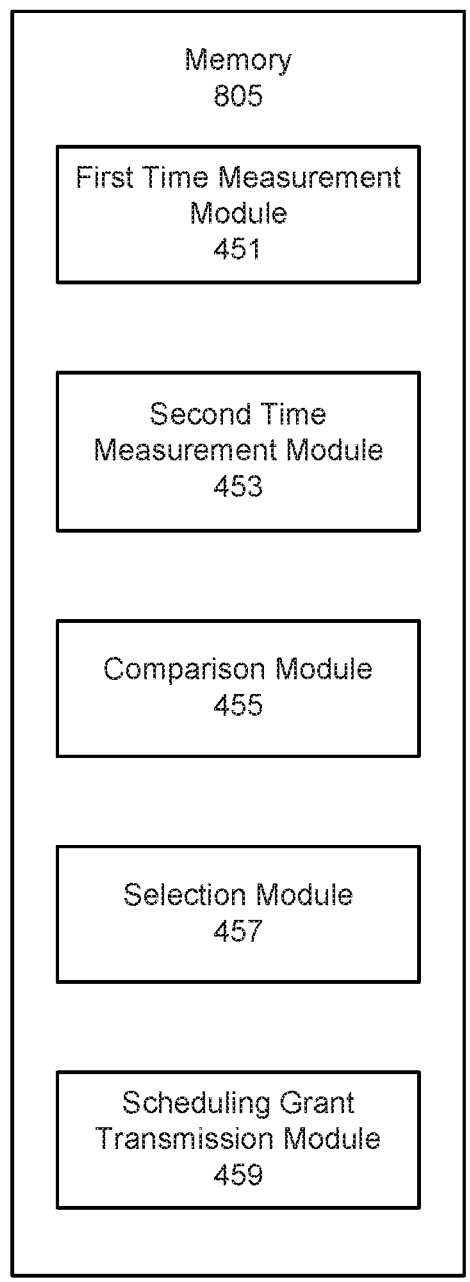

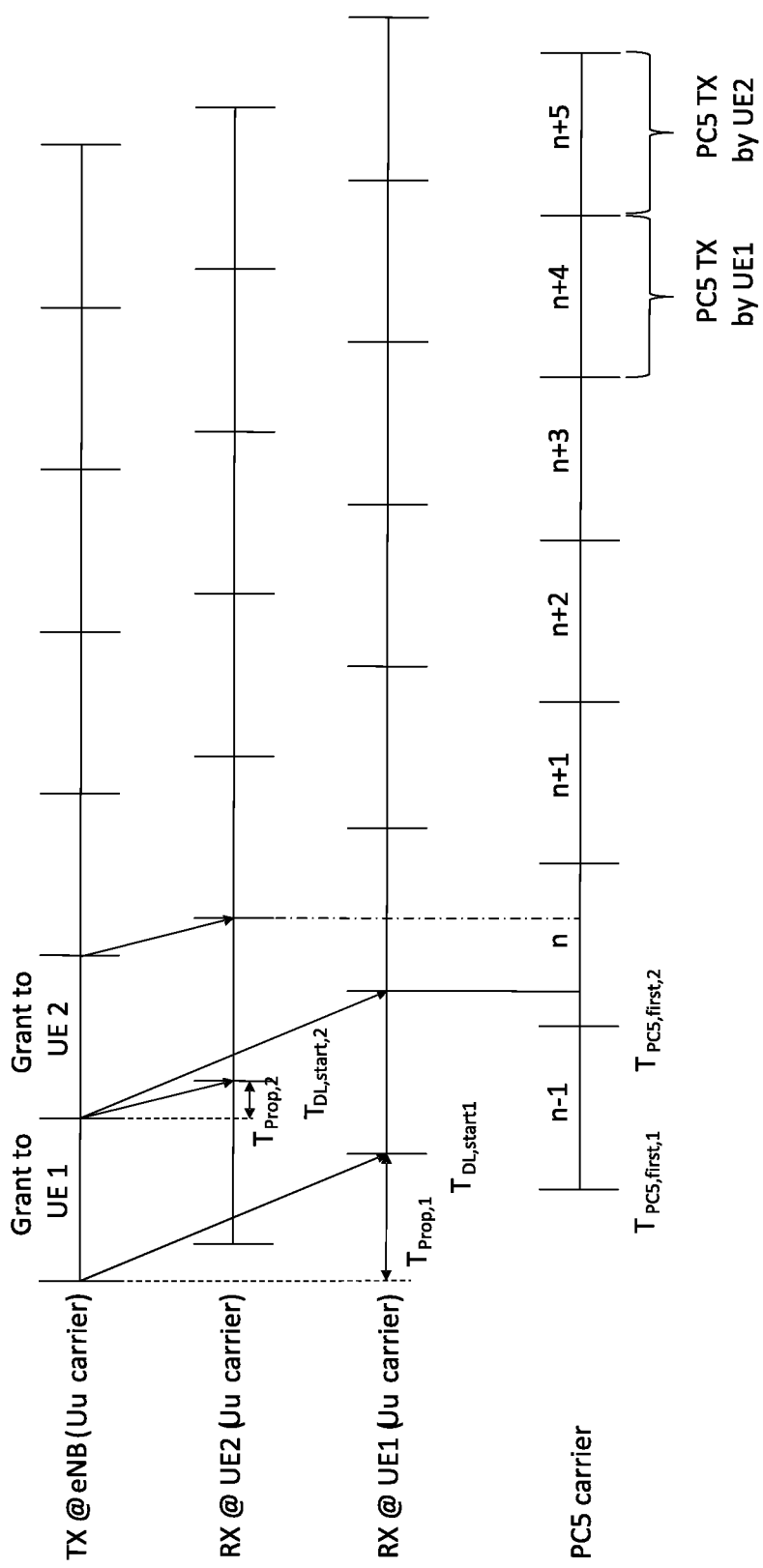

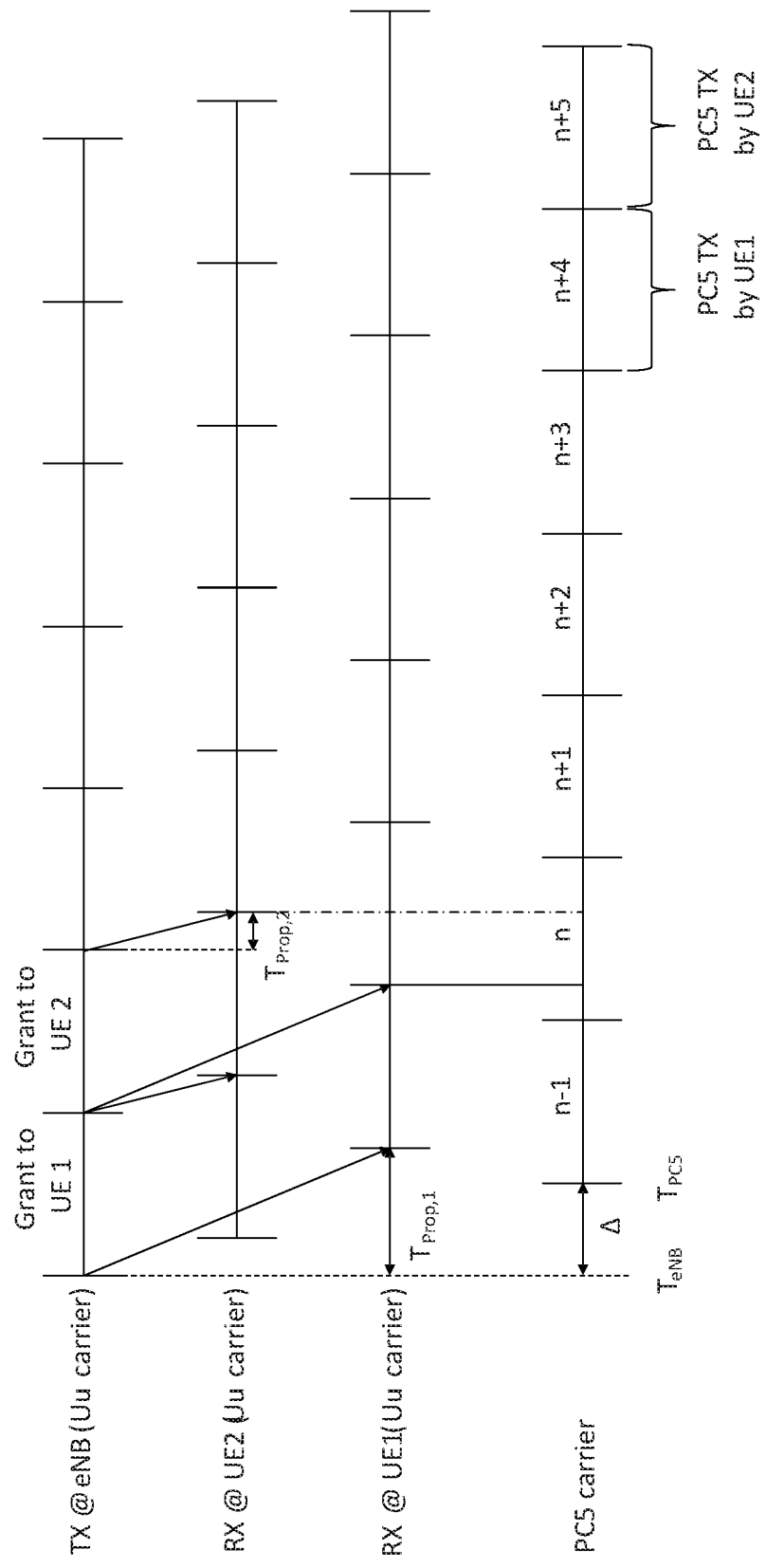

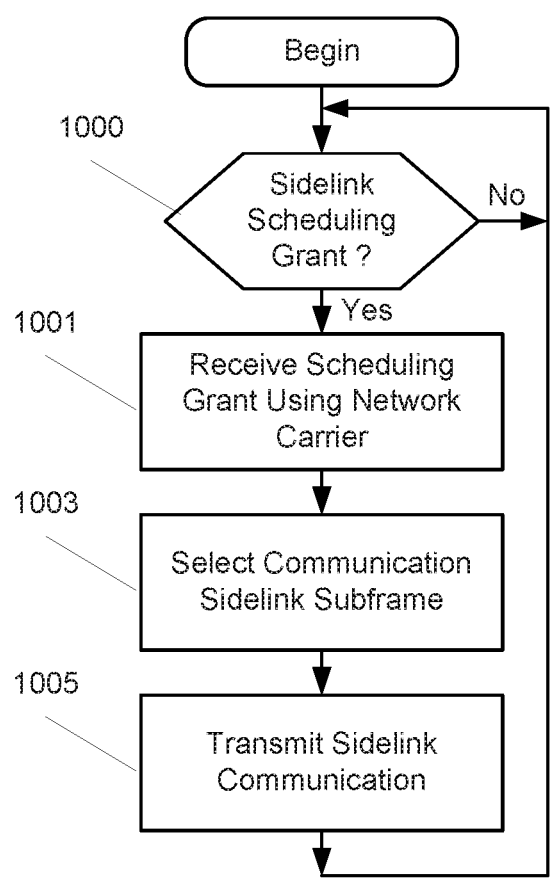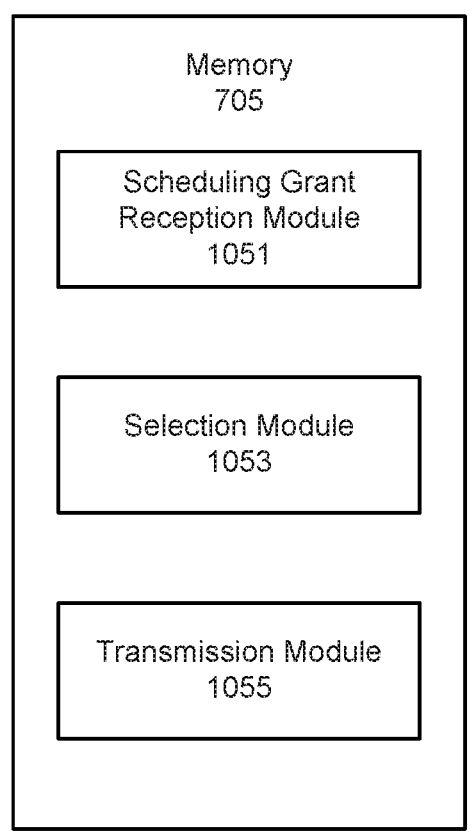

METHODS PROVIDING SCHEDULING FOR SIDELINK COMMUNICATIONS AND RELATED WIRELESS TERMINALS AND NETWORK NODES

This application is a 35 U.S.C. § 371 national stage application of PCT International Application No. PCT/SE2018/050245 filed on Mar. 14, 2018, which in turns claims domestic priority to U.S. Provisional Patent Application No. 62/476,100, filed on Mar. 24, 2017, the disclosures and content of which are incorporated by reference herein in their entirety.

TECHNICAL FIELD

The present disclosure relates to the field of wireless communications, and more particularly, to wireless vehicular communications and related methods and devices.

BACKGROUND

During Release 14, the LTE standard has been extended with support of device-to-device D2D (specified as "sidelink") features targeting both commercial and Public Safety applications. Some applications enabled by Rel-12 LTE are device discovery, where devices can sense the proximity of another device and associated application by broadcasting and detecting discovery messages that carry device and application identities. Another application consists of direct communication based on physical channels terminated directly between devices.

In Release 14, the LTE specification is extended to include support of vehicle-to-anything V2X communication, which includes any combination of direct communication between vehicles V2V, between vehicles and pedestrians V2P, and between vehicles and infrastructure V2I. V2X communication may take advantage of a network NW infrastructure, when available, but at least basic V2X connectivity should be possible even in case of lack of NW coverage.

FIG. 1 is a schematic diagram illustrating V2X scenarios for an LTE-based Radio Access Network NW. As shown in FIG. 1, V2I (vehicle-to-infrastructure) communications may be provided between a vehicle and the radio access network (RAN), V2V (vehicle-to-vehicle) communications may be provided directly between different vehicles (without communicating through the radio access network), and V2P (vehicle-to-pedestrian) communications may be provided directly between a vehicle and a device held/carried by the pedestrian (e.g., a smartphone, a tablet computer, etc.). V2X communications are meant to include any/all of V2I, V2P, and V2V communications. As used herein, the term wireless terminal UE may refer to any non-network terminal such as a vehicular wireless terminal (e.g., UE-1, UE-2, UE-3, etc.) or a personal wireless terminal held/carried by a pedestrian (e.g., a smartphone, a tablet computer, etc.), and a sidelink communication may refer to wireless communication that is directly terminated between any two such wireless terminals UEs (without passing through network infrastructure. Such sidelink communications may thus include D2D communications, V2V communications, V2P communications, etc.

V2X communications may carry both non-safety and safety information, where each of the applications and services may be associated with specific requirements sets, e.g., in terms of latency, reliability, capacity, etc.

ETSI has defined two types of messages for road safety: Co-operative Awareness Message (CAM) and Decentralized Environmental Notification Message (DENM).

CAM: The CAM message is intended to enable vehicles, including emergency vehicles, to notify their presence and other relevant parameters in a broadcast fashion. Such messages target other vehicles, pedestrians, and infrastructure, and are handled by their applications. CAM message also serve as active assistance to safety driving for normal traffic. The availability of a CAM message is indicatively checked for every 100 ms, yielding a maximum detection latency requirement of less than or equal to 100 ms for most messages. However, the latency requirement for Pre-crash sensing warning may be 50 ms.

DENM: The DENM message is event-triggered, such as by braking, and the availability of a DENM message is also checked for every 100 ms, and the requirement of maximum latency is less than or equal to 100 ms.

The package size of CAM and DENM message varies from 100+ to 800+ bytes and the typical size is around 300 bytes. The message is supposed to be detected by all vehicles in proximity.

The SAE (Society of the Automotive Engineers) also defined the Basic Safety Message (BSM) for dedicated short-range communications (DSRC) with various message sizes defined.

According to the importance and urgency of the messages, the BSMs may be further classified into different priorities.

The Release 14 specification includes two scheduling modes in V2X, hereinafter referred to as Mode 3 and Mode 4 which are further discussed below:

In Mode 3, the eNB schedules the PC5 transmissions (i.e., V2X sidelink transmissions using a PC5 carrier). To schedule a PC5 transmission, the eNB sends a PC5 scheduling grant using the Downlink LTE Uu interface. This grant may include, among other things, information about the time-frequency resources to be used for PC5 transmission (i.e., the specific subframe and RBs). The information about the time of the transmission is relative. One example illustrating this is that if the scheduling grant is received in subframe 'n', the PC5 transmission takes place in subframe 'n'+4.

In Mode 4, a UE schedules its own transmissions according to a distributed resource allocation algorithm that is part of the specification.

This disclosure is concerned with Mode 3 scheduling, i.e. the eNB scheduling mode.

To establish successful communication, the transmitter and receiver should share common time and frequency references. That is, the transmitter and receiver should be synchronized in time and/or frequency. This disclosure is concerned with time synchronization. Time synchronization includes determining the subframe boundaries, i.e., the point in time in which each subframe starts and ends, as well as the index of the subframe.

For cellular communication, i.e., uplink and/or downlink communications between a wireless terminal or UE and a network node in LTE, the eNB network node is the synchronization source. Wireless terminals (or UEs) acquire synchronization through specific signals known as synchronization signals transmitted by the eNB. Two types of cellular synchronization may be distinguished as follows:

Downlink (DL) timing refers to the reference used by the UE to process the signals received from the eNB. This corresponds to the time at which the signal is transmitted from the eNB plus the propagation time between eNB and UE.

Uplink (UL) timing is the reference used by the UE when transmitting signals to the eNB. The UL timing is configured by the eNB using Timing Advance (TA) commands. These commands instruct the UE to move forward or backward relative to the reference by a certain quantity.

For direct device-to-device (D2D) communication, also referred to as sidelink communications, several synchronization sources are defined in the specification in addition to DL timing:

UTC (Universal Coordinated Time) timing, which is also referred to as GNSS (Global Navigation Satellite Network) timing, refers to an absolute time reference. A UE or eNB can acquire UTC from a GNSS signal, for example.

SLSS (SideLink Synchronization Signal) timing is a timing reference that is transmitted from UE to UE using a distributed time protocol. SLSS timing may originate from the NW, UTC, or some other source and is propagated by the UEs to provide synchronization to UEs that have neither NW nor GNSS coverage.

Mode-3 deployments for V2X sidelink communications may involve two carriers (a network carrier and a sidelink carrier) as follows:

A sidelink carrier for UE-UE communications may use the LTE PC5 interface, referred to as a PC5 carrier. Sidelink communications directly terminated between two UEs may be transmitted using a sidelink or a PC5 carrier.

A network carrier for eNB-UE communications may use the LTE Uu interface, referred as a Uu carrier. Scheduling grants transmitted from the eNB to the UE for PC5 transmissions may be transmitted using a network or a Uu carrier.

The PC5 carrier and the Uu carrier could be the same or different carriers. If the carriers are different, then their timing references may be different. That is, at any node (UE, eNB) the subframe number in the PC5 and Uu carriers may not be the same. Similarly, the subframe boundaries in the PC5 and Uu carriers may not be the same. Depending on the case, the actual relationship between the two timings may or may not be known by the different nodes. Due to hardware inaccuracies and other considerations outside the scope of this disclosure, a timing reference may drift over time. Consequently, the relationship between the two timings may vary over time.

Accordingly, a wireless terminal may transmit sidelink transmissions over a sidelink carrier based on scheduling information received over a network carrier, but timings of the sidelink and network carriers may be different. Such differences in timings of the sidelink and network carriers may create ambiguity regarding the grant for the sidelink carrier.

SUMMARY

According to some embodiments of inventive concepts, methods may be provided to operate a first wireless terminal providing network communication with a radio access network using a network carrier and providing sidelink communications using a sidelink carrier. A scheduling grant may be received from the radio access network using a network subframe of the network carrier. A first time measurement relating to the sidelink carrier may be obtained, and a second time measurement relating to the network carrier may be obtained. Responsive to the scheduling grant, the first time measurement, and the second time measurement, a communication sidelink subframe of the sidelink carrier may be selected to be used for a sidelink communication.

According to some other embodiments of inventive concepts, a first wireless terminal may be adapted to provide network communication with a radio access network using a network carrier and to provide sidelink communication using a sidelink carrier. The wireless terminal may be adapted to receive a scheduling grant from the radio access network using a network subframe of the network carrier, obtain a first time measurement relating to the sidelink carrier, and obtain a second time measurement relating to the network carrier. The wireless terminal may also be adapted to select a communication sidelink subframe of the sidelink carrier to be used for a sidelink communication responsive to the scheduling grant, the first time measurement, and the second time measurement.

According to still other embodiments of inventive concepts, a first wireless terminal may be adapted to provide network communication with a radio access network using a network carrier and to provide sidelink communication using a sidelink carrier. The first wireless terminal may include a transceiver configured to provide wireless network communication with a radio access network using a network carrier and to provide wireless sidelink communication with a sidelink carrier, and a processor coupled with the transceiver. The processor may be configured to provide wireless network communication and wireless sidelink communication through the transceiver. The processor may also be configured to receive a scheduling grant from the radio access network using a network subframe of the network carrier, to obtain a first time measurement relating to the sidelink carrier, and to obtain a second time measurement relating to the network carrier. The processor may be further configured to select a communication sidelink subframe of the sidelink carrier to be used for a sidelink communication responsive to the scheduling grant, the first time measurement, and the second time measurement.

According to some embodiments of inventive concepts, transmission in the same subframe in the PC5 carrier by wireless terminals scheduled using different subframes in the Uu carrier may be reduced/avoided. Stated in other words, ambiguity of scheduling may be reduced.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 2 is a timing diagram illustrating interference between two sidelink communications occurring over a same subframe of a sidelink carrier;

FIG. 3A is a flow chart and FIG. 3B is a block diagram illustrating wireless terminal UE operations and modules according to some embodiments of inventive concepts;

FIG. 4A is a flow chart and FIG. 4B is a block diagram illustrating network node eNB operations and modules according to some embodiments of inventive concepts;

FIGS. 5 and 6 are timing diagrams illustrating timing according to some embodiments inventive concepts;

FIG. 10A is a flow chart and FIG. 10B is a block diagram illustrating wireless terminal operations according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
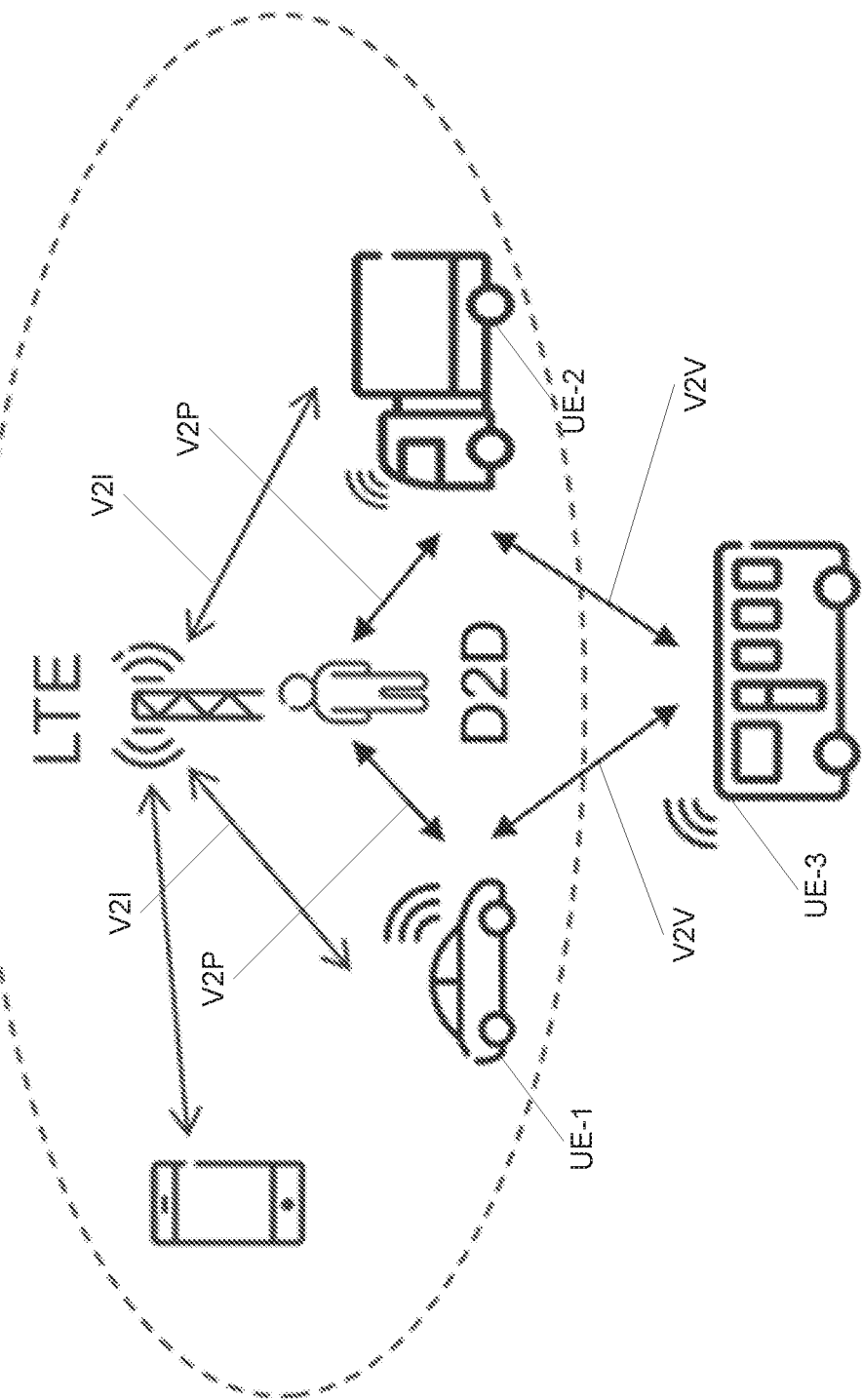
FIG. 1 is a schematic diagram illustrating communication scenarios using sidelink V2X communications within a coverage area of an LTE-based radio access network NW.
Figure 7:
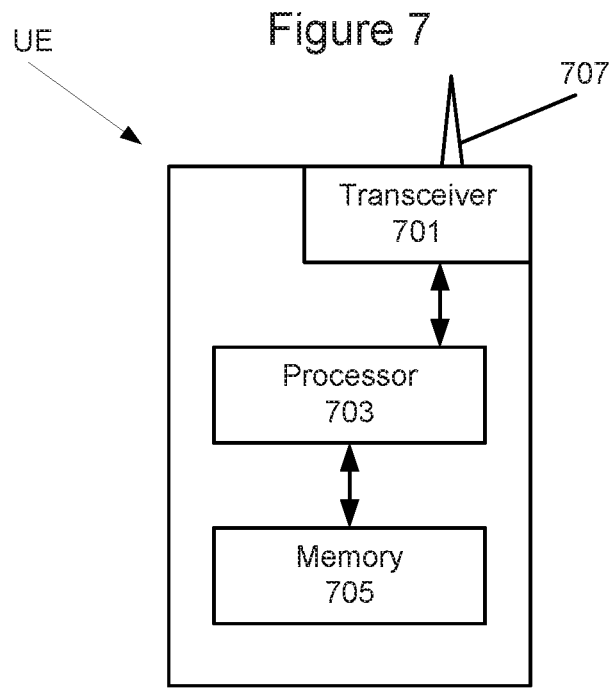
FIG. 7 is a block diagram illustrating a wireless terminal UE according to some embodiments of inventive concepts.

FIG. 7 is a block diagram illustrating elements of a wireless terminal UE (also referred to as a wireless device, a wireless communication device, a wireless communication terminal, user equipment, a user equipment node/terminal/device, etc.) configured to provide sidelink V2X communication according to embodiments of inventive concepts. As shown, wireless terminal UE may include an antenna 707, and a transceiver circuit 701 (also referred to as a transceiver) including a transmitter and a receiver configured to provide uplink and downlink radio communications with a base station of a radio access network, and to provide sidelink V2X communications directly with other sidelink V2X wireless communication devices. Wireless terminal UE may also include a processor circuit 703 (also referred to as a processor) coupled to the transceiver circuit, and a memory circuit 705 (also referred to as memory) coupled to the processor circuit. The memory circuit 705 may include computer readable program code that when executed by the processor circuit 703 causes the processor circuit to perform operations according to embodiments disclosed herein. According to other embodiments, processor circuit 703 may be defined to include memory so that a separate memory circuit is not required. Wireless terminal UE may also include an interface (such as a user interface) coupled with processor 703, and/or wireless terminal UE may be incorporated in a vehicle.

As discussed herein, operations of wireless terminal UE may be performed by processor 703 and/or transceiver 701. For example, processor 703 may control transceiver 701 to transmit sidelink communications through transceiver 701 over a radio interface to another UE and/or to receive sidelink communications through transceiver 701 from another UE over a radio interface. Moreover, modules may be stored in memory 705, and these modules may provide instructions so that when instructions of a module are executed by processor 703, processor 703 performs respective operations.

Figure 9:
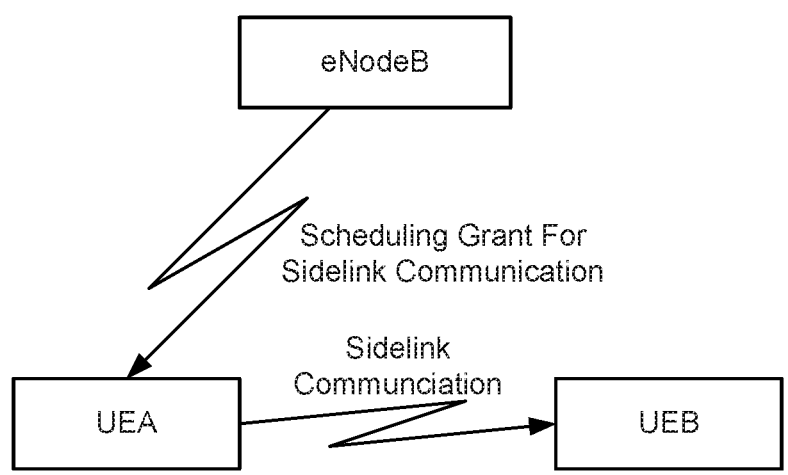
FIG. 9 is a block diagram illustrating scheduling grants and sidelink communications according to some embodiments of inventive concepts.

FIG. 9 is a block diagram illustrating network communications between a first wireless terminal UEA and a network node eNodeB (eNB) over a network carrier (e.g., a Uu carrier), and between the first wireless terminal UEA and a second wireless terminal UEB over a sidelink carrier (e.g., a PC5 carrier). More particular, the network node eNB may transmit a Scheduling Grant for a sidelink communication over the network carrier to the first wireless terminal UEA, and the first wireless terminal UEA may transmit a sidelink communication over a sidelink carrier to a second wireless terminal UEB based on the scheduling grant.

As discussed herein, network and sidelink carriers may be different and their timings may thus be different. According to some embodiments, a relationship between the network and sidelink carrier timings may be known, and according to some other embodiments a relationship between network and sidelink carrier timings may not be known. For example, the PC5 carrier may use UTC timing whereas the Uu carrier of the eNB may not be synchronized to GNSS and the eNB may indeed have no knowledge of GNSS timing at all.

When using Mode 3, the timing reference of the Uu and PC5 carriers may be different. Therefore, a scheduling grant for transmission in the PC5 carrier may be interpreted in different ways by different receivers, depending on a collection of factors, including UE positions relative to the eNB, relationships between the timing references, etc.

For example, a scheduling grant transmitted by the eNB (using the Uu carrier) may be interpreted by some UEs as a grant for transmission in subframe 'x' (in the PC5 carrier) and as a grant for transmission in subframe 'x'+1 (in the PC5 carrier) by other UEs. This situation is illustrated in FIG. 2:

The eNB transmits a PC5 transmission grant to UE1 on a subframe in the Uu carrier. In the following subframe, it transmits a PC5 scheduling grant to UE2.

UE1, which is located relatively distant from the eNB, receives the grant. Thus, UE1 assumes that it is scheduled for transmission on the PC5 carrier in the fourth complete subframe after the arrival of the grant (end of the packet). Since subframe 'n' has already started by the time UE1 finishes receiving the grant, the PC5 transmission from UE1 will take place during subframe 'n'+4.

UE2, which is located relatively close to the eNB, receives the grant. Thus, UE2 assumes that it is scheduled for transmission on the PC5 carrier in the fourth complete subframe after the arrival of the grant (end of the packet). Since subframe 'n' has already started by the time UE2 finishes receiving the grant, the PC5 transmission will take place during subframe 'n'+4.

Although the eNB used different subframes to transmit the grants to UE1 and UE2, both UEs perform their PC5 transmission on the same subframe. This behavior may be undesirable as the two transmissions over the same subframe of the PC5 carrier may interfere.

In the example of FIG. 2, UE1 is chosen to be relatively far from the eNB and UE2 to be relatively close to the eNB to illustrate issues relating to the independent timing of the network and sidelink carriers. However, depending on the actual relationship between the two timing references the same issue may arise even if UE1 and UE2 are relatively close to each other (i.e., within direct communication range). Moreover, since the relationship between timings may vary, the effects may be unpredictable. That is, the eNB may have no way to know which pairs of UEs (or UE pairs) may be affected by the different network and sidelink carrier timings.

According to some embodiments of inventive concepts, methods to establish a non-ambiguous subframe identification for any given scheduling grant may be provide for a wireless terminal UE and/or for a network NW node eNB.

According to some embodiments, an occurrence of UEs being scheduled using different subframes on the Uu carrier but transmitting in the same subframe on the PC5 carrier may be reduced/avoided.

According to some embodiments disclosed herein, methods for wireless terminals (e.g., UE nodes) may be provided.

FIG. 3A is a flow chart illustrating operations of a wireless terminal or UE to transmit a sidelink communication based on a scheduling grant from a network node eNB, and FIG. 3B illustrates related modules in memory 705. As shown in FIG. 3A, the following operations may be performed:

Operation 301. Wireless terminal UE1 processor 703 may receive a scheduling grant (through transceiver 701) over a network carrier for a sidelink transmission over a sidelink carrier, for example, using scheduling grant receiving module 351 of memory 705.

Operation 303. Wireless terminal UE1 processor 703 may obtain/determine a first time measurement $T_A$, for example, using first time measurement module 353 of memory 705.

Operation 305. Wireless terminal UE1 processor 703 may obtain/determine a second time measurement $T_B$, for example, using second time measurement module 355 of memory 705.

Operation 307. Wireless terminal UE1 processor 703 may compare first and second time measurements $T_A$ and $T_B$, for example, using comparison module 357 of memory 705.

Operation 309. Based on the comparison of $T_A$ and $T_B$, wireless terminal UE1 processor 703 may select/determine which subframe of the sidelink carrier should be used for the sidelink transmission, for example, using selection module 359 of memory 705.

Operation 311. Wireless terminal UE1 processor 703 may transmit the sidelink communications through transceiver 701 to UE2 using the subframe determined in operation 309, for example, using transmission module 361 of memory 705.

Operations of some embodiments of FIG. 3A performed by the wireless terminal UE1 may be performed as discussed below with respect to the timing diagram of FIG. 5. In the following discussion, $T_{Prop}$ is used to denote the time that it takes for a signal (e.g., the scheduling grant) to travel from the network node eNB to the wireless terminal UE, and $T_{DL,start}$ is used to denote the arrival time at the wireless terminal of the scheduling grant sent by the network node eNB. Moreover, $T_A$ is used to denote a first time measurement, and TA is used to denote a timing advance used by the wireless terminal to uplink transmissions of network communications to the network node of the radio access network.

Operation 303. The wireless terminal UE1 may obtain (e.g., determine) the first time measurement $T_A$, which corresponds to the first subframe boundary of the sidelink carrier (e.g., PC5 carrier) that is not earlier that $T=T_{DL,start}-T_{prop}$, and this time is denoted as $T_A=T_{PC5,first}$ as shown in FIG. 5. As used herein, the term subframe boundary may refer to the start/beginning of a subframe (also referred to as an initial subframe boundary) or the end of a subframe (also referred to as a final subframe boundary). For example, $T_{PC5,first,1}$ of FIG. 5 may be an initial boundary at the start/beginning of subframe n−1, $T_{PC5,first,2}$ may be a final boundary at the end of subframe n−1, and $T_{PC5,first,2}$ may also be an initial boundary at the start/beginning of subframe n. In FIG. 5, $T_{PC5,first,1}$ corresponds to the scheduling grant transmitted to wireless terminal UE1, and $T_{PC5,first,2}$ corresponds to the scheduling grant transmitted to wireless terminal UE2. As shown in FIG. 5, sidelink carrier subframe n may be the subframe during which reception of the scheduling grant at a wireless terminal is complete, and sidelink carrier subframe n−1 may be the preceding subframe during which reception of the scheduling grant at wireless terminal begins.

In some embodiments, this may include the possibility that the boundary of the sidelink subframe coincides exactly with $T=T_{DL,start}-T_{prop}$.

In some embodiments, $T_{Prop}$ may be estimated form the value of the timing advance TA, such that $T_{Prop}=TA/2$.

Operation 305. The wireless terminal UE1 may determine the second time measurement $T_B$ which corresponds to the DL timing reference $T_{DL}$ of the network carrier (e.g., the Uu carrier). More particularly, the second time measurement $T_B$ may be the time of arrival of the scheduling grant (start of reception of the scheduling grant packet/subframe) at the wireless terminal UE1, such that $T_B=T_{DL,start}$.

Operation 307. The comparison may be performed by comparing $T_B$ ($T_{DL,start}$) and $T_A$ ($T_{PC5,first}$), to determine whether $T_{PC5,first} \leq T_{DL,start}$ ($T_A \leq T_B$) or $T_{PC5,first} > T_{DL,start}$ ($T_A > T_B$).

Operation 309. Based on the comparison, wireless terminal processor 703 may:

Transmit in subframe "x" of the sidelink carrier if $T_{PC5,first} \leq T_{DL,start}$. In the example of FIG. 5, "x" is n+4.

Transmit in subframe "y" of the sidelink carrier if $T_{PC5,first} > T_{DL,start}$. In the example of FIG. 5, "y" is n+5.

Here 'x'≠'y', for example, 'y'='x'+1. Note that, the equality sign (≤) could have alternatively been assigned to the second case (≥) as shown below:

Transmit in subframe "x" of the sidelink carrier if $T_{PC5,first} < T_{DL,start}$. In the example of FIG. 5, "x" is n+4.

Transmit in subframe "y" of the sidelink carrier if $T_{PC5,first} \geq T_{DL,start}$. In the example of FIG. 5, "y" is n+5.

In the example of FIG. 5, each network subframe on the network carrier has a 1 ms duration, each sidelink subframe (on the sidelink carrier) has a 1 ms duration, and each sidelink carrier subframe is identified by an index shown as n−1, n, n+1, n+2, etc. Accordingly, the selection of the particular subframe index (e.g., n+4 or n+5) depends of the comparison of $T_{PC5,first}$ and $T_{DL,start}$. Where the subframe length is 1 ms.

In the example of FIG. 5, the sidelink carrier (e.g., PC5 carrier) may be assumed to use a timing reference that is common to all wireless terminals UEs (e.g., based on a UTC or GNSS timing reference). Moreover, in FIG. 5, one wireless terminal is identified as UE1 being relatively distant from the network node eNB (with a longer propagation delay $T_{Prop,1}$), and another wireless terminal is identified as UE2 being relatively close to the network node eNB (with a shorter propagation delay $T_{Prop,2}$). In the example of FIG. 5, wireless terminals UE1 and UE2 are not necessarily in communication with each other.

In the example of FIG. 5, the sidelink carrier (e.g., a PC5 carrier) may use a timing reference that is common to all UEs (e.g., based on a UTC or GNSS timing reference). In that case:

Wireless terminal UE1 may receive a scheduling grant (which was transmitted by the network node eNB on the Uu carrier) in the network subframe that starts at $T=T_{DL,start,1}$ and finishes at $T=T_{DL,end,1}$ (it should be noted that $T_{DL,end,1}=T_{DL,start,1}+1$ ms) at Operation 301. From the point of view of the sidelink carrier (e.g., PC5 carrier), the grant for wireless terminal UE1 arrives (end of the packet) within subframe 'n'.

Operation 303: $T_A=T_{PC5,first,1}$.
Operation 305: $T_B=T_{DL,start,1}$.
Operation 307: $T_{PC5,first}\leq T_{DL,start}$.
Operation 309: Based on Operation 307, subframe n+4 is selected.
Operation 311: Wireless terminal UE1 transmits sidelink communication using sidelink carrier subframe n+4.

Wireless terminal UE2 receives a scheduling grant (which was transmitted by the network node eNB on the Uu carrier) in the subframe that starts at $T=T_{DL,start,2}$ and finishes at $T=T_{DL,end,2}$ (it should be noted that $T_{DL,end,2}=T_{DL,start,2}+1$ ms) at Operation 301. From the point of view of the sidelink carrier (e.g., PC5 carrier), the grant for wireless terminal UE2 arrives (end of the packet) within subframe 'n'.

Operation 303: $T_A=T_{PC5,first,2}$.
Operation 305: $T_B=T_{DL,start,2}$.
Operation 307: $T_{PC5,first,2}>T_{DL,start,2}$.
Operation 309: Based on Operation 307, subframe x+5 is selected.
Operation 311: Wireless terminal UE2 transmits sidelink communication using sidelink carrier subframe n+5.

According to some other wireless terminal embodiments of FIG. 3A, the wireless terminal UE1 may use a network node eNB to wireless terminal UE propagation time to determine a sidelink carrier subframe grant. Such embodiments may, in theory, provide the same results as discussed above, but in practice, implementation may lead to some variation. In such embodiments, wireless terminal operations of FIG. 3A may be performed as follows:

Operation 303. The wireless terminal UE may determine the first time measurement, $T_A$, which corresponds to the eNB-UE propagation time $T_{Prop}$ on the network carrier (e.g., Uu carrier), such that $T_A=T_{Prop}$. The propagation time $T_{Prop}$ is the time that it takes for the signal (e.g., the scheduling grant) to travel from the network node eNB to the wireless terminal UE. $T_{prop}$ may be estimated from the value of the Timing Advance TA such that $T_{Prop}=TA/2$. As used herein, $T_A$ is a first timing measurement, and TA is a Timing Advance used by a wireless terminal to time uplink transmission for alignment with a network node subframe structure when received at the network node.

Operation 305. The wireless terminal UE determines the second time measurement, $T_B$, which corresponds to the value of the difference Δ between the network node eNB timing reference used for downlink transmission on the network carrier and the sidelink carrier (e.g., PC5 carrier) timing reference, such that $T_B=\Delta$, and $\Delta=T_{PC5}-T_{eNB}$ where $T_{eNB}$ corresponds to the start of a DL subframe in the Uu carrier from the point of view of the eNB; and $T_{PC5}$ corresponds to the start of the first subframe in the PC5 carrier after $T=T_{eNB}$ (on the PC5 carrier). In principle, the value of Δ is the same for all UEs (although in practice there may be small variations across UEs due to the way this value is computed). Stated in other words, Δ is an offset between the start of the network carrier subframe used to transmit the scheduling grant (measured at the network node) and the start of the next sidelink carrier subframe.

The value of $T_{eNB}$ may not be known by a wireless terminal UE. However, $T_{eNB}$ may be estimated by combining the DL timing and the propagation time $T_{Prop}$. For example, $T_{eNB}=T_{DL}-T_{Prop}$.

Operation 307. Wireless terminal UE may compare Δ and $T_{Prop}$.

Operation 309. Wireless terminal UE selects the sidelink carrier subframe as follows:

If $\Delta \leq T_{Prop}$, then the UE transmits in subframe 'x' of the sidelink (e.g., PC5) carrier.

If $\Delta > T_{prop}$ then the UE transmits in subframe 'y' of the sidelink (e.g., PC5) carrier).

Here 'x'≠'y', for example 'y'='x'+1. Note that, the equality (≤) could have alternatively been assigned to the second case (≥), as shown below:

If $\Delta < T_{Prop}$, then the UE transmits in subframe 'x' of the sidelink (e.g., PC5) carrier.

If $\Delta \geq T_{prop}$ then the UE transmits in subframe 'y' of the sidelink (e.g., PC5) carrier.

Wireless terminal UE1 operations of FIG. 3A will now be discussed with reference to the timing diagram of FIG. 6, where it is assumed that the sidelink carrier (e.g., PC5 carrier) uses a timing reference that is common to all wireless terminals UEs (e.g., UTC or GNSS timing reference).

Wireless terminal UE1 receives a scheduling grant (which was transmitted by the eNB on the network Uu carrier) in the subframe that starts at $T=T_{DL,start,1}$ (shown in FIG. 5) and finishes at $T=T_{DL,end,1}$ at Operation 301. From the point of view of the sidelink (e.g., PC5) carrier, the grant for wireless terminal UE1 arrives (end of the packet) within sidelink carrier subframe 'n'.

Operation 303. $T_A=T_{prop,1}$.
Operation 305. $T_B=\Delta$.
Operation 307. Compare $T_{prop,1}$ and Δ.
Operation 309. Based on the comparison of Operation 307 for wireless terminal UE1, $\Delta \leq T_{Prop}$ and thus wireless terminal UE1 transmits in subframe n+4 of the sidelink (e.g., PC5) carrier.

Wireless terminal UE2 receives a scheduling grant (which was transmitted by the eNB on the network Uu carrier) in the subframe that starts at $T=T_{DL,start,2}$ (shown in FIG. 5) and finishes at $T=T_{DL,end,2}$ at Operation 301. From the point of view of the sidelink (e.g., PC5) carrier, the grant for wireless terminal UE2 also arrives (end of the packet) within sidelink carrier subframe 'n'.

Operation 303. $T_A=T_{prop,2}$.
Operation 305. $T_B=\Delta$.
Operation 307. Compare $T_{prop,2}$ and Δ.
Operation 309. Based on the comparison of Operation 307 for wireless terminal UE2, $\Delta > T_{prop}$ and thus wireless terminal UE2 transmits in subframe n+5 of the sidelink (e.g., PC5) carrier.

Regarding the wireless terminal embodiments discussed above with respect to FIGS. 3A, 3B, 5, and 6, variations of such embodiments may be provided. For example, variations of each embodiment can be obtained by considering shifts of the values of $T_A$ and $T_B$. For example, the end of a subframe may be considered instead of the beginning of the subframe, the next subframe (boundary) may be considered instead of the previous subframe (boundary), etc. These rules may be equivalent in theory but they may result in slightly different implementations with slightly different results in practice. Similarly, by varying the behavior for the case in which two or more measurements coincide, it may be possible to obtain simple variations too.

As discussed above, embodiments of inventive concepts may include wireless terminal operations used to establish a non-ambiguous identification of a sidelink carrier subframe to be used by a wireless terminal responsive to a scheduling grant from a network node.

Operations of a wireless terminal UE will now be discussed with reference to the flow chart of FIG. 3A and the modules of FIG. 3B according to some embodiments of inventive concepts. For example, modules of FIG. 3B may be stored in wireless terminal memory 705 of FIG. 7, and these modules may provide instructions so that when the instructions of a module are executed by wireless terminal processor 703, processor 703 performs respective operations of the flow chart of FIG. 3A.

Responsive to a first sidelink scheduling grant at block 300, wireless terminal processor 703 may receive a first scheduling grant from the radio access network through transceiver 701 using a network subframe of the network carrier at block 301, for example, using scheduling grant reception module 351. The first sidelink scheduling grant may be completed during a first reference sidelink subframe.

At block 303, processor 703 may obtain a first time measurement relating to the sidelink carrier, for example, using first time measurement module 353. At block 305, processor 703 may obtain a second time measurement relating to the network carrier, for example using second time measurement module 355. At block 307, processor 703 may compare the first and second time measurements, for example, using comparison module 357.

Responsive to the first sidelink scheduling grant, the first time measurement, and the second time measurement, processor 703 may select a first communication sidelink subframe of the sidelink carrier to be used for a first sidelink communication at block 309 based on comparing the first and second time measurements, for example, using selection module 359. The first communication sidelink subframe may have a first delay after the first reference sidelink subframe responsive to the comparison of the first and second time measurements. For example, the first delay after the first reference sidelink subframe may be selected responsive to the first sidelink scheduling grant being completed during a first half of the first reference sidelink subframe.

After selecting the sidelink subframe, processor 703 may transmit the first sidelink communication using the first sidelink subframe of the sidelink carrier at block 311, for example, using transmission module 361. For example, processor 703 may transmit the first sidelink communication through transceiver 701 to another wireless terminal using the first sidelink subframe of the sidelink carrier so that the sidelink communication is directly terminated between the wireless terminals.

Responsive to a second sidelink scheduling grant at block 300, processor 703 may receive the second scheduling grant from the radio access network through transceiver 701 using a second network subframe of the network carrier at block 301, for example, using scheduling grant reception module 351. Moreover, the second scheduling grant being completed during a second reference sidelink subframe.

At block 303, processor 703 may obtain a third time measurement relating to the network carrier and/or the sidelink carrier, for example, using first time measurement module 353, and the first and third time measurements may be of the same type. At block 305, processor 703 may obtain a fourth time measurement relating to the network carrier and/or the sidelink carrier, for example, using second time measurement module 355, and the second and fourth time measurements may be of the same type. At block 307, processor 703 may compare the third and fourth time measurements, for example, using comparison module 357.

Responsive to the second sidelink scheduling grant, the third time measurement, and the fourth time measurement, processor may select a second communication sidelink subframe of the sidelink carrier to be used for a sidelink communication at block 309, for example, using selection module 359. Processor 703, for example, may select the second communication sidelink subframe to have a second delay after the second reference sidelink subframe responsive to the second sidelink scheduling grant being completed during a second half of the second reference sidelink subframe, with the second delay be longer than the first delay. After selecting the second sidelink subframe, processor 703 may transmit the second sidelink communication using the second sidelink subframe of the sidelink carrier at block 311, for example, using transmission module 361. For example, processor 703 may transmit the second sidelink communication through transceiver 701 to another wireless terminal using the second sidelink subframe of the sidelink carrier so that the second sidelink communication is directly terminated between the wireless terminals.

The network carrier may be a Uu carrier, and the sidelink carrier may be a PC5 carrier. The wireless terminal may be a vehicular wireless terminal, and each of the sidelink communications may be at least one of a vehicle-to-vehicle (V2V) communication or a vehicle-to-pedestrian (V2P) communication. Moreover, each of the network subframe including a scheduling grant and each of the communication sidelink subframes may have a same duration. Moreover, subframes of the network carrier and subframes of the sidelink carrier may have different timing references.

According to some embodiments of FIG. 3A discussed above with respect to FIG. 5, the first time measurement may be a time measurement of a boundary ($T_{PC5,first}$) of a measurement sidelink subframe, and the second time measurement may be a time measurement of a boundary of the network subframe ($T_{DL,start}$) including the first scheduling grant at the first wireless device. Similarly, the third time measurement may be a time measurement of a boundary of a measurement sidelink subframe, and the fourth time measurement may be a time measurement of a boundary of the network subframe including the second scheduling grant at the first wireless device. As used herein, a measurement sidelink subframe is a sidelink subframe that is used for a time measurement, for example, shown in FIG. 5 as sidelink subframe n−1 for wireless terminal UE1 and sidelink subframe n for wireless terminal UE2 in FIG. 5.

The first time measurement may be a time measurement of an initial boundary of the measurement sidelink subframe, the second time measurement may be a time measurement of a boundary of the network subframe including the scheduling grant, and the boundary of the network subframe may occur during the measurement sidelink subframe. At block 309, processor 703 may select the communication sidelink subframe having a first delay after the measurement sidelink subframe responsive to the first time measurement being less than the second time measurement or select the communication sidelink subframe having a second delay after the measurement sidelink subframe responsive to the first time measurement being greater than the second time measurement.

The second time measurement may be a time measurement of an initial boundary of the network subframe including the scheduling grant or a final boundary of the network subframe including the scheduling grant.

According to some embodiments of FIG. 3A discussed above with respect to FIG. 6, the first time measurement may be a propagation delay ($T_{Prop}$) of transmission from the radio access network to the wireless terminal, and the second time measurement may be a time offset (Δ) between subframe boundaries of the network carrier and the sidelink carrier. Similarly, the third time measurement may be a propagation delay ($T_{Prop}$) of transmission from the radio access network to the wireless terminal, and the fourth time measurement may be a time offset (Δ) between subframe boundaries of the network carrier and the sidelink carrier. Processor 703 may select the communication sidelink subframe based on comparing the first and second time measurements.

The propagation delay may be determined based on a timing advance used by the wireless terminal to transmit uplink communications to the radio access network. For example, the propagation delay may be determined as one half of the timing advance used by the wireless terminal to transmit uplink communications to the radio access network.

The first scheduling grant may be completed during a first reference sidelink subframe (n), and the processor 703 may select the communication sidelink subframe having a first delay after the reference sidelink subframe responsive to the first time measurement being less than the second time measurement or select the communication sidelink subframe having a second delay after the reference sidelink subframe responsive to the first time measurement being greater than the second time measurement. As used herein, a reference sidelink subframe is a sidelink subframe during which reception of a scheduling grant for a wireless terminal is completed, for example, shown in FIG. 6 as sidelink subframe n for both of wireless terminals UE1 and UE2.

In embodiments of FIGS. 3A and 3B, the sidelink communications may be at least one of Device-to-Device (D2D) communications, Vehicle-to-Vehicle (V2V) communications, and Vehicle-to-Pedestrian (V2P) communications.

Various operations of FIG. 3A and/or modules of FIG. 3B may be optional with respect to some embodiments of wireless terminals and related methods. Regarding methods of example embodiment 1 (set forth below), for example, operations of blocks 300, 307, and 311 of FIG. 3A may be optional, and regarding related wireless terminals, modules 357 and 361 of FIG. 3B may be optional.

According to Embodiments of FIGS. 3A, 3B, and 5, ambiguity of PC5 scheduling may thus be reduced by taking into account both the Uu and PC5 carriers, where:

$T_{DL,start,x}$ corresponds to the time of arrival of the scheduling grant (start of the packet) for UE x.

$T_{PC5,first,x}$ corresponds to the first boundary of subframe (on the PC5 carrier) after $T=T_{DL,start,x}-T_{Prop,x}$ for UE x. $T_{Prop,x}$ is the propagation time between eNB and UE x (which amounts to ½ of the value of the $T_A$).

Comparing both values, the UE can determine whether to transmit in subframe n+4 or n+5, where n is the index of the subframe in which it receives and decodes the DCI carrying the PC5 scheduling grant.

If $T_{PC5,first,x} \leq T_{DL,start,x}$ then UE x transmits in subframe n+4 in the PC5 carrier.

If $T_{PC5,first,x} > T_{DL,start,x}$ then UE x transmits in subframe n+5 in the PC5 carrier.

This may provide/ensure that grants transmitted on different DL subframes result in PC5 transmissions in different PC5 subframes.

This scheduling is illustrated in FIG. 5. As explained above, the eNB may send grants to UE1 and UE2 in two consecutive DL subframes. Both grants are received and decoded during subframe n (from the point of view of the PC5 carrier). However:

$T_{PC5,first,1} \leq T_{DL,start,1}$ and thus UE1 transmits in subframe n+4 in the PC5 carrier.

$T_{PC5,first,2} > T_{DL,start,2}$ and thus UE2 transmits in subframe n+5 in the PC5 carrier.

According to some embodiments of inventive concepts of FIG. 5, for sidelink transmission mode 3, The UE shall determine the subframes and resource blocks for transmitting SCI format 1 as follows:

CI format 1 is transmitted in two physical resource blocks per slot in each subframe where the corresponding PSSCH is transmitted.

If the UE receives in subframe n DCI format 5A with the CRC scrambled by the SL-V-RNTI, one transmission of PSCCH is in the PSCCH resource $L_{Init}$ (described in subclause 14.2.4 of 3GPP TS 36.213 v14.1.0, Evolved Universal Terrestrial Radio Access (E-UTRA); Physical Layer Procedures (Release 14), (2016 December)) in subframe $n+k_{init}$ where $L_{Init}$ is the value indicated by "Lowest index of the subchannel allocated to the initial transmission" associated with the configured sidelink grant (described in 3GPP TS 36.213 v14.1.0) and Option 1: $k_{init}$ is equal to 4+m if the subframe $n+k_{init}$ is included in $(t_0^{SL}, t_1^{SL}, t_2^{SL}, \ldots)$ which is determined by subclause 14.1.5 of 3GPP TS 36.213 v14.1.0, and if $T_{PC5,first} \leq T_{DL,start}$. The value m is indicated by 'Subframe offset' field in the corresponding DCI format 5A if this field is present and m=0 otherwise.

Option 2: otherwise $k_{init}$ is equal to 4+m+1 if the subframe $n+k_{init}$ is included in $(t_0^{SL}, t_1^{SL}, t_2^{SL}, \ldots)$ which is determined by subclause 14.1.5 of 3GPP TS 36.213 v14.1.0, and if $T_{PC5,first} > T_{DL,start}$. The value m is indicated by 'Subframe offset' field in the corresponding DCI format 5A if this field is present and m=0 otherwise.

Option 3: otherwise $k_{init}$ is the smallest integer which is larger than or equal to 4+m and fulfils the condition that subframe $n+k_{init}$ is included in $(t_0^{SL}, t_1^{SL}, t_2^{SL}, \ldots)$ which is determined by subclause 14.1.5 of 3GPP TS 36.213 v14.1.0. The value m is indicated by 'Subframe offset' field in the corresponding DCI format 5A if this field is present and m=0 otherwise.

Option 1 and Option 2 may cover a case in which there may be an ambiguity. That is, the case when $k_{init}$ is equal to 4+m in the current specification. Option 3 covers the case when $k_{init}$ is larger than 4+m. In this case, the operation 'larger than' may already reduce/remove uncertainty. As explained before, an equivalent set of changes may also be used for transmissions scheduled by an SPS grant.

Figure 8:
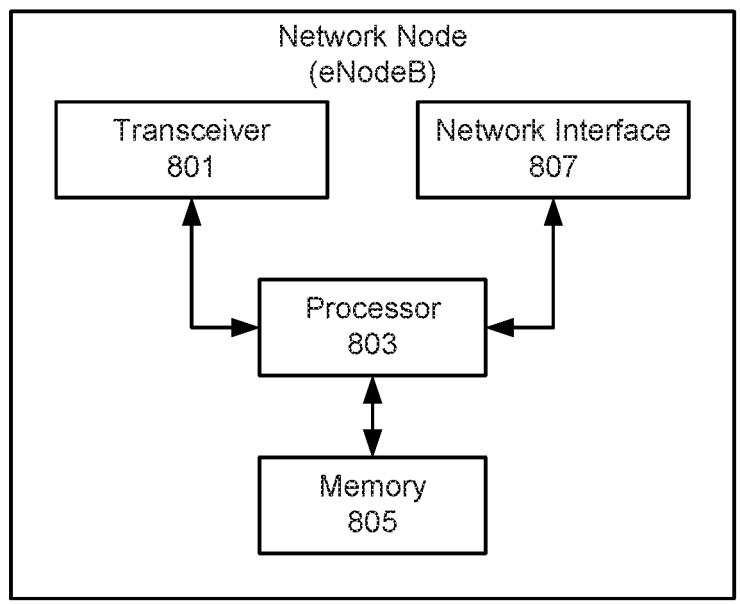
FIG. 8 is a block diagram illustrating a network node eNB according to some embodiments of inventive concepts.

FIG. 8 is a block diagram illustrating elements of a node (also referred to as a network node, base station, eNB, eNodeB, etc.) of a Radio Access Network (RAN) configured to provide cellular communication according to embodiments of inventive concepts. As shown, the network node may include a transceiver circuit 801 (also referred to as a transceiver) including a transmitter and a receiver configured to provide uplink and downlink radio communications with wireless terminals. The network node may include a network interface circuit 807 (also referred to as a network interface) configured to provide communications with other nodes (e.g., with other base stations and/or core network nodes) of the RAN. The network node may also include a processor circuit 803 (also referred to as a processor) coupled to the transceiver circuit, and a memory circuit 805 (also referred to as memory) coupled to the processor circuit. The memory circuit 805 may include computer readable program code that when executed by the processor circuit 803 causes the processor circuit to perform operations according to embodiments disclosed herein. According to other embodiments, processor circuit 803 may be defined to include memory so that a separate memory circuit is not required.

As discussed herein, operations of the network node may be performed by processor 803, network interface 807, and/or transceiver 801. For example, processor 803 may control transceiver 801 to transmit communications through transceiver 801 over a radio interface to one or more UEs and/or to receive communications through transceiver 801 from one or more UEs over a radio interface. Similarly, processor 803 may control network interface 807 to transmit communications through network interface 807 to one or more other network nodes and/or to receive communications through network interface from one or more other network nodes. Moreover, modules may be stored in memory 805, and these modules may provide instructions so that when instructions of a module are executed by processor 803, processor 803 performs respective operations.

According to some embodiments disclosed herein, methods for NW nodes (e.g., eNBs) may be provided.

FIG. 4A is a flow chart illustrating operations of a network node eNB to provide a scheduling grant over a network interface to a wireless terminal for sidelink communications, and FIG. 4B illustrates related modules in memory 805. As shown in FIG. 4A, the following operations may be performed:

Operation 401. Network node eNB processor 803 may obtain/determine a first time measurement $T_C$, for example, using first time measurement module 451 of memory 805.

Operation 403. Network node eNB processor 803 may obtain/determine a second time measurement $T_D$, for example, using second time measurement module 453 of memory 805.

Operation 405. Network node eNB processor 803 may compare first and second time measurements $T_C$ and $T_D$, for example, using comparison module 455 of memory 805.

Operation 407. Network Node eNB processor 803 may select/determine a sidelink carrier subframe to be used by the wireless terminal UE1 to transmit a sidelink communication (e.g., a PC5 communication) based on the comparison, for example, using selection module 457 of memory 805.

Operation 409. Network node eNB processor 803 may transmit control information (e.g., a scheduling grant through transceiver 801 to wireless terminal UE1 regarding the choice of the sidelink subframe for the sidelink communication, for example, using scheduling grant transmission module 459 of memory 805.

Embodiments of FIG. 4A in the network node eNB will now be discussed with reference to the timing diagram of FIG. 6. In this embodiment, the steps in the method in the network NW node eNB may be provided as follows:

Operation 401: The NW node eNB determines the first time measurement $T_C$, which corresponds to the eNB-UE propagation time $T_{Prop}$ on the Uu carrier, such that $T_C = T_{Prop}$.

Option 1: The value $T_{Prop}$ may be measured by a wireless terminal UE and reported to the NW node eNB. For example, it could be measured by the wireless terminal as described in embodiment 2.

Option 2: The value $T_{Prop}$ may be measured directly by the NW node eNB. For example, it could be measured as described in embodiment 2 taking into account that the value of $T_A$ may be available at the NW node eNB too.

Operation 403. The NW node eNB determines the second time measurement $T_D$, which corresponds to the value of the difference $\Delta$ between the eNB timing reference used for downlink transmission and the sidelink (e.g., PC5) timing reference: $T_D = \Delta$. The value $\Delta$ may be obtained in several different ways:

Option 1: The value $\Delta$ may be obtained/measured by a UE and reported to the NW node. For example, it could be measured as described in embodiment 2.

Option 2: The value $\Delta$ may be obtained/measured directly by the NW node. For example, the NW node may derive the PC5 timing from UTC in those cases in which the timing of the PC5 carrier is based on UTC.

Operation 405. The NW node eNB compares $T_C$ and $T_D$.

Operation 407. Based on the comparison of Operation 405, the NW node eNB may:

If $\Delta \leq T_{Prop}$, then the NW node decides that the UE transmits in subframe 'x' in the PC5 carrier.

If $\Delta > T_{prop}$ then the NW node decides that the UE transmits in subframe 'y' in the PC5 carrier.

Here 'x'≠'y', for example 'y'='x'+1. Note that, the equality (≤) could have alternatively been assigned to the second case (≥), as shown below:

If $\Delta < T_{Prop}$, then the NW node decides that the UE transmits in subframe 'x' in the PC5 carrier.

If $\Delta \geq T_{prop}$ then the NW node decides that the UE transmits in subframe 'y' in the PC5 carrier.

Operation 409. The NW node schedules the transmission of the UE in the appropriate subframes. This may be done in different ways:

The NW node chooses the appropriate DL subframe in the Uu carrier for transmitting DCI so that the existing UE behavior ensures that the UE transmits in the correct subframe.

The scheduling grant includes a field to indicate to the UE in which subframe to perform the transmission.

Regarding NW node embodiments discussed above with respect to FIGS. 4A, 4B, and 6, variations of such embodiments may be provided. For example, variations of NW node embodiments may be similar to variations discussed above with respect to wireless terminal embodiments. Moreover, operations of the NW node may be distributed across two or more NW nodes. For example:

In Operation 401, Option 2, the value $T_{Prop}$ may be measured by a second NW node and reported to the first NW node.

In Operation 403, Option 2, the value $\Delta$ may be measured by a second NW node and reported to the first NW node.

In other embodiments, the NW node may derive some of the time measurements based on position information. For example, the NW node may compute $T_{Prop}$ using knowledge of its own position and the position of the UE. Similarly, the comparison of Operation 405 and/or the decision of Operation 407 may make use of information on the position of one or more nodes (UE, NW node, etc.). According to some embodiments, the eNB may be the NW node of interest.

As discussed above, embodiments of inventive concepts may include network node operations used to establish a non-ambiguous identification of a sidelink carrier subframe to be used by a wireless terminal responsive to a scheduling grant from a network node.

Operations of a network node will now be discussed with reference to the flow chart of FIG. 4A and the modules of FIG. 4B. For example, modules of FIG. 4B may be stored in base station memory 805 of FIG. 8, and these modules may provide instructions so that when the instructions of a module are executed by processor 803, processor 803 performs respective operations of the flow chart of FIG. 4A.

Responsive to a decision to transmit a sidelink scheduling grant at block 400, network node processor 803 may obtain a first time measurement relating to the network carrier and/or the sidelink carrier at block 401, for example, using first time measurement module 451, and processor 803 may obtain a second time measurement relating to the network carrier and/or the sidelink carrier at block 403, for example, using second time measurement module 453. At block 405, processor 803 may compare the first and second time measurements, for example, using comparison module 455, and at block 407, processor may select a sidelink subframe based on comparing the first and second time measurements, for example, using comparison module 455.

Responsive to the first time measurement and the second time measurement, processor 803 may transmitting (409) a sidelink scheduling grant to the wireless terminal using the network subframe of the network carrier that was selected at block 407. The sidelink scheduling grant may be a scheduling grant for a sidelink communication for the wireless terminal using a sidelink subframe of the sidelink carrier.

According to some embodiments discussed above with respect to FIG. 6, the first time measurement may be a propagation delay ($T_{Prop}$) of transmission from the radio access network to the wireless terminal and the second time measurement is a time offset ($\Delta$) between subframe boundaries of the network carrier and the sidelink carrier. The propagation delay, for example, may be determined based on a timing advance (TA) for the wireless terminal. At block 407, processor 803 may thus select the sidelink subframe based on the propagation delay and the time offset. For example, processor 803 may select a first sidelink subframe responsive to the propagation delay being greater than the time offset being or select a second sidelink subframe responsive to the propagation delay being less than the time offset.

The propagation delay may be determined based on a timing advance used by the wireless terminal to transmit uplink communications to the radio access network. For example, the propagation delay may be determined as one half of the timing advance used by the wireless terminal to transmit uplink communications to the radio access network.

To transmitting the scheduling grant, processor 803 may transmit the scheduling grant including first delay information defining a first delay of the sidelink subframe responsive to the first time measurement being less than the second time measurement or transmit the scheduling grant including second delay information defining a second delay of the sidelink subframe responsive to the first time measurement being greater than the second time measurement. Moreover, the first and second delays may be different.

As discussed herein, a reference sidelink subframe may be defined as a sidelink subframe when the scheduling grant is received by the wireless terminal, the first delay may be defined as a first number of sidelink subframes following the reference sidelink subframe, the second delay may be defined as a second number of sidelink subframes following the reference sidelink subframe, and the first and second numbers may be different. In the example of FIG. 6, sidelink subframe "n" is a reference subframe both for the sidelink scheduling grant to wireless terminal UE1 and for the sidelink scheduling grant to wireless terminal UE2, because reception of both sidelink scheduling grants at the respective wireless terminals is complete during sidelink subframe n.

The network carrier may be a Uu carrier, and the sidelink carrier may be a PC5 carrier. The wireless terminal may be a vehicular wireless terminal, and the sidelink communication may be at least one of a vehicle-to-vehicle (V2V) communication or a vehicle-to-person (V2P) communication. Moreover, the network subframe including the scheduling grant and the communication sidelink subframe may have a same duration, and subframes of the network carrier and subframes of the sidelink carrier may have different timing references.

In embodiments of FIGS. 4A and 4B, the sidelink communications may be at least one of Device-to-Device (D2D) communications, Vehicle-to-Vehicle (V2V) communications, and Vehicle-to-Pedestrian (V2P) communications.

Various operations of FIG. 4A and/or modules of FIG. 4B may be optional with respect to some embodiments of network nodes and related methods. Regarding methods of example embodiment 30 (set forth below), for example, operations of blocks 400, 405, and 407 of FIG. 4A may be optional, and regarding related termination nodes, modules 455 and 457 of FIG. 4B may be optional.

Operations of a wireless terminal UE will now be discussed with reference to the flow chart of FIG. 10A and the modules of FIG. 10B according to some embodiments of inventive concepts. For example, modules of FIG. 10B may be stored in wireless terminal memory 705 of FIG. 7, and these modules may provide instructions so that when the instructions of a module are executed by wireless terminal processor 703, processor 703 performs respective operations of the flow chart of FIG. 10A.

As discussed above with respect to FIG. 4A, the network node may transmit the sidelink scheduling grant with delay information. When this occurs, the wireless terminal may use the delay information to select a communication sidelink subframe. Responsive to a first sidelink scheduling grant at block 1000, processor 703 may receive the first scheduling grant from the radio access network through transceiver 701 using a first network subframe of the network carrier at block 1001, for example, using scheduling grant reception module 1051. Moreover, the first scheduling grant may include first delay information. Responsive to the first scheduling grant and the first delay information, processor 703 may select a first communication sidelink subframe of the sidelink carrier to be used for a first sidelink communication at block 1003, for example, using selection module 1053. At block 1005, processor may transmit (1005) the sidelink communication using the first sidelink subframe of the sidelink carrier at block 1005, for example, using transmission module 1055.

The scheduling grant may completed during a reference sidelink subframe (e.g., sidelink subframe "n" of FIG. 6), and processor 703 may select the first communication sidelink subframe having a first delay after the first reference sidelink subframe responsive to the first delay information having a first value or select the first communication sidelink subframe having a second delay after the first reference sidelink subframe responsive to the first delay information having a second value, with the first and second values being different.

The first communication sidelink subframe may be selected having the first delay after the first reference sidelink subframe responsive to the delay information having the first value. Responsive to a second sidelink scheduling grant at block 1000, processor 703 may receive a second scheduling grant from the radio access network using a second network subframe of the network carrier at block 1001, for example, using scheduling grant reception module 1051. The second scheduling grant may include second delay information different than the first delay information, and the second scheduling grant may be completed during a second reference sidelink subframe.

Responsive to the second scheduling grant and the second delay information, processor 703 may select a second communication sidelink subframe of the sidelink carrier to be used for a second sidelink communication at block 1003, for example, using selection module 1053. Processor 703 may select the second communication sidelink subframe having a second delay after the second reference sidelink subframe, with the first and second delays being different. After selecting the second sidelink subframe, processor 703 may transmit the second sidelink communication using the second sidelink subframe of the sidelink carrier at block 1005, for example, using transmission module 1055.

The network carrier may be a Uu carrier, and the sidelink carrier may be a PC5 carrier. Sidelink scheduling grants may thus be used to schedule transmissions of sidelink communications from one wireless terminal to another wireless terminal using sidelink subframes of the sidelink carrier so that the sidelink communications are directly terminated between the wireless terminals. The wireless terminal may be a vehicular wireless terminal, and each of the sidelink communications may be at least one of a vehicle-to-vehicle (V2V) communication or a vehicle-to-person (V2P) communication. Moreover, network subframes including scheduling grants and communication sidelink subframes may have a same duration and different timing references.

In embodiments of FIGS. 10A and 10B, the sidelink communications may be at least one of Device-to-Device (D2D) communications, Vehicle-to-Vehicle (V2V) communications, and Vehicle-to-Pedestrian (V2P) communications.

Various operations of FIG. 10A and/or modules of FIG. 10B may be optional with respect to some embodiments of wireless terminals and related methods. Regarding methods of example embodiment 22 (set forth below), for example, operations of blocks 1000 and 1005 of FIG. 10A may be optional, and regarding related wireless terminals, module 1055 of FIG. 10B may be optional.

Further non-limiting embodiments are discussed by way of example in "Corrections to Mode 3 Scheduling", R1-1705818, 3GPP TSG RAN WG1 Meeting #88bis, 3-7 Apr. 2017, the disclosure of which is hereby incorporated herein in its entirety by reference.

Example embodiments of inventive concepts are discussed below.

Embodiment 1

A method of operating a first wireless terminal providing network communication with a radio access network using a network carrier and providing sidelink communications using a sidelink carrier, the method comprising: receiving (301) a scheduling grant from the radio access network using a network subframe of the network carrier; obtaining (303) a first time measurement relating to the network carrier and/or the sidelink carrier; obtaining (305) a second time measurement relating to the network carrier and/or the sidelink carrier; responsive to the scheduling grant, the first time measurement, and the second time measurement, selecting (309) a communication sidelink subframe of the sidelink carrier to be used for a sidelink communication.

Embodiment 2

The method of Embodiment 1 wherein the first time measurement is a time measurement of a boundary ($T_{PC5,first}$) of a measurement sidelink subframe, and wherein the second time measurement is a time measurement of a boundary of the network subframe ($T_{DL,start}$) including the scheduling grant at the first wireless device.

Embodiment 3

The method of Embodiment 2 further comprising: comparing (307) the first and second time measurements, wherein selecting comprises selecting the communication sidelink subframe based on comparing the first and second time measurements.

Embodiment 4

The method of Embodiment 3 wherein the first time measurement is a time measurement of an initial boundary of the measurement sidelink subframe, wherein the second time measurement is a time measurement of a boundary of the network subframe including the scheduling grant, wherein the boundary of the network subframe occurs during the measurement sidelink subframe, and wherein selecting the communication sidelink subframe comprises one of selecting the communication sidelink subframe having a first delay after the measurement sidelink subframe responsive to the first time measurement being less than the second time measurement and selecting the communication sidelink subframe having a second delay after the measurement sidelink subframe responsive to the first time measurement being greater than the second time measurement.

Embodiment 5

The method of Embodiment 4 wherein the second time measurement is a time measurement of an initial boundary of the network subframe including the scheduling grant.

Embodiment 6

The method of Embodiment 4 wherein the second time measurement is a time measurement of a final boundary of the network subframe including the scheduling grant.

Embodiment 7

The method of Embodiment 1 wherein the first time measurement is a propagation delay ($T_{Prop}$) of transmission from the radio access network to the wireless terminal and the second time measurement is a time offset ($\Delta$) between subframe boundaries of the network carrier and the sidelink carrier.

Embodiment 8

The method of Embodiment 7 further comprising: comparing (307) the first and second time measurements, wherein selecting comprises selecting the communication sidelink subframe based on comparing the first and second time measurements.

Embodiment 9

The method of Embodiment 8, wherein the scheduling grant is completed during a reference sidelink subframe (n), wherein selecting the communication sidelink subframe comprises one of selecting the communication sidelink subframe having a first delay after the reference sidelink subframe responsive to the first time measurement being less than the second time measurement and selecting the communication sidelink subframe having a second delay after the reference sidelink subframe responsive to the first time measurement being greater than the second time measurement.

Embodiment 10

The method of any of Embodiments 7-9 wherein the propagation delay is determined based on a timing advance used by the wireless terminal to transmit uplink communications to the radio access network.

Embodiment 11

The method of Embodiment 10 wherein the propagation delay is determined as one half of the timing advance used by the wireless terminal to transmit uplink communications to the radio access network.

Embodiment 12

The method of any of Embodiments 1-11, wherein the scheduling grant is a first scheduling grant and the communication sidelink subframe is a first communication sidelink subframe, wherein the first scheduling grant is completed during a first reference sidelink subframe, and wherein selecting the first communication sidelink subframe comprises selecting the first communication sidelink subframe having a first delay after the first reference sidelink subframe responsive to first scheduling grant being completed during a first half of the first reference sidelink subframe, the method further comprising: receiving (301) a second scheduling grant from the radio access network using a second network subframe of the network carrier, wherein the second scheduling grant is completed during a second reference sidelink subframe; obtaining (303) a third time measurement relating to the network carrier and/or the sidelink carrier; obtaining (305) a fourth time measurement relating to the network carrier and/or the sidelink carrier; responsive to the second scheduling grant, the third time measurement, and the fourth time measurement, selecting (309) a second communication sidelink subframe of the sidelink carrier to be used for a sidelink communication, wherein selecting the second communication sidelink subframe comprises selecting the second communication sidelink subframe having a second delay after the second reference sidelink subframe responsive to second scheduling grant being completed during a second half of the second reference sidelink subframe.

Embodiment 13

The method of any of Embodiments 1-12 further comprising: after selecting the sidelink subframe, transmitting (311) the sidelink communication using the sidelink subframe of the sidelink carrier.

Embodiment 14

The method of Embodiment 13 wherein transmitting comprises transmitting the sidelink communication from the first wireless terminal to a second wireless terminal using the sidelink subframe of the sidelink carrier so that the sidelink communication is directly terminated between the first and second wireless terminals.

Embodiment 15

The method of any of Embodiments 1-14 wherein the network carrier is a Uu carrier.

Embodiment 16

The method of any of Embodiments 1-15 wherein the sidelink carrier is a PC5 carrier.

Embodiment 17

The method of any of Embodiments 1-16 wherein the wireless terminal is a vehicular wireless terminal, and wherein the sidelink communication comprises at least one of a vehicle-to-vehicle, V2V, communication, or a vehicle-to-person, V2P, communication.

Embodiment 18

The method of any of Embodiments 1-17 wherein network subframe including the scheduling grant and the communication sidelink subframe have a same duration.

Embodiment 19

The method of any of Embodiments 1-18 wherein subframes of the network carrier and subframes of the sidelink carrier have different timing references.

Embodiment 20

A method of operating a first wireless terminal providing network communication with a radio access network using a network carrier and providing sidelink communications using a sidelink carrier, the method comprising: receiving (1001) a scheduling grant from the radio access network using a network subframe of the network carrier, wherein the scheduling grant includes delay information; and responsive to the scheduling grant and the delay information, selecting (1003) a communication sidelink subframe of the sidelink carrier to be used for a sidelink communication.

Embodiment 21

The method of Embodiment 20 wherein the scheduling grant is completed during a reference sidelink subframe, wherein selecting the communication sidelink subframe comprises one of selecting the communication sidelink subframe having a first delay after the reference sidelink subframe responsive to the delay information having a first value and selecting the communication sidelink subframe having a second delay after the reference sidelink subframe responsive to the delay information having a second value, and wherein the first and second values are different.

Embodiment 22

The method of Embodiment 20, wherein the scheduling grant is a first scheduling grant having first delay information and the communication sidelink subframe is a first communication sidelink subframe, wherein the first scheduling grant is completed during a first reference sidelink subframe, and wherein selecting the first communication sidelink subframe comprises selecting the first communication sidelink subframe having a first delay after the first reference sidelink subframe responsive to the first delay information, the method further comprising: receiving (1001) a second scheduling grant from the radio access network using a second network subframe of the network carrier, wherein the second scheduling grant includes second delay information different than the first delay information, and wherein the second scheduling grant is completed during a second reference sidelink subframe; and responsive to the second scheduling grant and the second delay information, selecting (1003) a second communication sidelink subframe of the sidelink carrier to be used for a second sidelink communication, wherein selecting the second communication sidelink subframe comprises selecting the second communication sidelink subframe having a second delay after the second reference sidelink subframe, wherein the first and second delays are different.

Embodiment 23

The method of any of Embodiments 20-22 further comprising: after selecting the sidelink subframe, transmitting (1005) the sidelink communication using the sidelink subframe of the sidelink carrier.

Embodiment 24

The method of Embodiment 23 wherein transmitting comprises transmitting the sidelink communication from the first wireless terminal to a second wireless terminal using the sidelink subframe of the sidelink carrier so that the sidelink communication is directly terminated between the first and second wireless terminals.

Embodiment 25

The method of any of Embodiments 20-24 wherein the network carrier is a Uu carrier and the sidelink carrier is a PC5 carrier.

Embodiment 26

The method of any of Embodiments 20-25 wherein the wireless terminal is a vehicular wireless terminal, and wherein the sidelink communication comprises at least one of a vehicle-to-vehicle, V2V, communication, or a vehicle-to-person, V2P, communication.

Embodiment 27

The method of any of Embodiments 20-26 wherein network subframe including the scheduling grant and the communication sidelink subframe have a same duration and different timing references.

Embodiment 28

A first wireless terminal, UE, comprising: a transceiver (701) configured to provide wireless network communication with a radio access network using a network carrier and to provide wireless sidelink communication with a sidelink carrier; and a processor (703) coupled with the transceiver, wherein the processor is configured to provide wireless network communication and wireless sidelink communication through the transceiver, and wherein the processor is configured to perform operations according to any of Embodiments 1-27.

Embodiment 29

A wireless terminal, UE, wherein the wireless terminal is adapted to perform according to any of embodiments 1-27.

Embodiment 30

A method of operating a network node, eNB, of a radio access network providing network communication using a network carrier and supporting sidelink communication using a sidelink carrier, the method comprising: obtaining (401) a first time measurement relating to the network carrier and/or the sidelink carrier; obtaining (403) a second time measurement relating to the network carrier and/or the sidelink carrier; and responsive to the first time measurement and the second time measurement, transmitting (409) a scheduling grant to the wireless terminal using a network subframe of the network carrier, wherein the scheduling grant is a scheduling grant for a sidelink communication for the wireless terminal using a sidelink subframe of the sidelink carrier.

Embodiment 31

The method of Embodiment 30 further comprising: comparing (405) the first and second time measurements, wherein transmitting the scheduling grant comprises transmitting the scheduling grant based on comparing the first and second time measurements.

Embodiment 32

The method of Embodiment 31 further comprising: selecting (407) the sidelink subframe based on comparing the first and second time measurements, wherein transmitting the scheduling grant comprises transmitting the scheduling grant using the sidelink subframe selected based on comparing the first and second time measurements.

Embodiment 33

The method of any of Embodiments 30-32 wherein the first time measurement is a propagation delay ($T_{Prop}$) of transmission from the radio access network to the wireless terminal and the second time measurement is a time offset ($\Delta$) between subframe boundaries of the network carrier and the sidelink carrier.

Embodiment 34

The method of Embodiment 33 wherein the propagation delay is determined based on a timing advance for the wireless terminal.

Embodiment 35

The method of Embodiment 30, wherein the first time measurement is a propagation delay ($T_{Prop}$) of transmission from the radio access network to the wireless terminal and the second time measurement is a time offset ($\Delta$) between subframe boundaries of the network carrier and the sidelink carrier, the method further comprising: selecting (407) the sidelink subframe based on the propagation delay and the time offset, wherein selecting comprises one of selecting a first sidelink subframe responsive to the propagation delay being greater than the time offset being and selecting a second sidelink subframe responsive to the propagation delay being less than the time offset.

Embodiment 36

The method of Embodiment 35 wherein the propagation delay is determined based on a timing advance used by the wireless terminal to transmit uplink communications to the radio access network.

Embodiment 37

The method of Embodiment 36 wherein the propagation delay is determined as one half of the timing advance used by the wireless terminal to transmit uplink communications to the radio access network.

Embodiment 38

The method of any of Embodiments 30-34 wherein transmitting the scheduling grant comprises one of transmitting the scheduling grant including first delay information defining a first delay of the sidelink subframe responsive to the first time measurement being less than the second time measurement and transmitting the scheduling grant including second delay information defining a second delay of the sidelink subframe responsive to the first time measurement being greater than the second time measurement, and wherein the first and second delays are different.

Embodiment 39

The method of Embodiment 38 wherein a reference sidelink subframe is defined as a sidelink subframe when the scheduling grant is received by the wireless terminal, wherein the first delay is defined as a first number of sidelink subframes following the reference sidelink subframe, wherein the second delay is defined as a second number of sidelink subframes following the reference sidelink subframe, and wherein the first and second numbers are different.

Embodiment 40

The method of any of Embodiments 30-39 wherein the network carrier is a Uu carrier.

Embodiment 41

The method of any of Embodiments 30-40 wherein the sidelink carrier is a PC5 carrier.

Embodiment 42

The method of any of Embodiments 30-41 wherein the wireless terminal is a vehicular wireless terminal, and wherein the sidelink communication comprises at least one of a vehicle-to-vehicle, V2V, communication, or a vehicle-to-person, V2P, communication.

Embodiment 43

The method of any of Embodiments 30-42 wherein the network subframe including the scheduling grant and the communication sidelink subframe have a same duration.

Embodiment 44

The method of any of Embodiments 30-43 wherein subframes of the network carrier and subframes of the sidelink carrier have different timing references.

Embodiment 45

A network node, eNB, of a radio access network, wherein the network node includes: a transceiver (801) configured to provide wireless network communication with a wireless terminal; and a processor (803) coupled with the transceiver, wherein the processor is configured to provide wireless network communications through the transceiver, and wherein the processor is configured to perform operations according to any of Embodiments 30-44.

Embodiment 46

A network node, eNB, of a radio access network, wherein the network node is adapted to perform according to any of Embodiments 30-44.

Explanations for abbreviations from the present disclosure are provided below.

| Abbreviation | Explanation |
| --- | --- |
| 3GPP | 3rd Generation Partnership Program |
| BSM | Basic Service Message |
| CAM | Collective Awareness Message |
| D2D | Device-to-Device |
| DCI | Downlink Control Information |
| DENM | Decentralized Environmental Notification Message |
| DL | Downlink |
| eNB | Evolved Node B |
| LTE | Long Term Evolution |
| NW | Network |
| PC5 | Direct communication interface between devices (UE-UE) |
| SAE | Society of the Automotive Engineers |
| TA | Timing Advance |
| UE | User Equipment |
| UL | Uplink |
| UTC | Universal Coordinated Time |
| Uu | Cellular communication interface (eNB-UE) |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following claims and their equivalents, and shall not be restricted or limited by the foregoing detailed description.

The invention claimed is:

1. A method of operating a first wireless terminal providing network communication with a radio access network using a network carrier and providing sidelink communications using a sidelink carrier, the method comprising:
   receiving a scheduling grant from the radio access network using a network subframe of the network carrier;
   obtaining a first time measurement relating to the sidelink carrier, wherein the first time measurement is a time measurement of an initial boundary of the measurement sidelink subframe;
   obtaining a second time measurement relating to the network carrier, wherein the second time measurement is a time measurement of an initial boundary of the network subframe including the scheduling grant; and
   responsive to the scheduling grant, the first time measurement, and the second time measurement, selecting a communication sidelink subframe of the sidelink carrier to be used for a sidelink communication, wherein selecting the communication sidelink subframe comprises one of selecting the communication sidelink subframe having a first delay after the measurement sidelink subframe responsive to the first time measurement being less than the second time measurement and selecting the communication sidelink subframe having a second delay after the measurement sidelink subframe responsive to the first time measurement being greater than the second time measurement.

2. The method of claim 1, wherein the first time measurement is a time measurement of a boundary of a measurement sidelink subframe, and wherein the second time measurement is a time measurement of a boundary of the network subframe, including the scheduling grant at the first wireless device.

3. The method of claim 2 further comprising:
comparing the first and second time measurements, wherein selecting comprises selecting the communication sidelink subframe based on comparing the first and second time measurements.

4. The method of claim 1, wherein the scheduling grant is a first scheduling grant and the communication sidelink subframe is a first communication sidelink subframe, wherein the first scheduling grant is completed during a first reference sidelink subframe, and wherein selecting the first communication sidelink subframe comprises selecting the first communication sidelink subframe having a first delay after the first reference sidelink subframe responsive to the first scheduling grant being completed during a first half of the first reference sidelink subframe, the method further comprising:
receiving a second scheduling grant from the radio access network using a second network subframe of the network carrier, wherein the second scheduling grant is completed during a second reference sidelink subframe;
obtaining a third time measurement relating to the sidelink carrier;
obtaining a fourth time measurement relating to the network carrier;
responsive to the second scheduling grant, the third time measurement, and the fourth time measurement, selecting a second communication sidelink subframe of the sidelink carrier to be used for a sidelink communication, wherein selecting the second communication sidelink subframe comprises selecting the second communication sidelink subframe having a second delay after the second reference sidelink subframe responsive to second scheduling grant being completed during a second half of the second reference sidelink subframe.

5. The method of claim 1 further comprising:
after selecting the sidelink subframe, transmitting the sidelink communication using the sidelink subframe of the sidelink carrier.

6. The method of claim 5, wherein transmitting comprises transmitting the sidelink communication from the first wireless terminal to a second wireless terminal using the sidelink subframe of the sidelink carrier so that the sidelink communication is directly terminated between the first and second wireless terminals.

7. The method of claim 1, wherein the network carrier is a Uu carrier.

8. The method of claim 1, wherein the sidelink carrier is a PC5 carrier.

9. The method of claim 1, wherein the wireless terminal is a vehicular wireless terminal, and wherein the sidelink communication comprises at least one of a vehicle-to-vehicle (V2V) communication, or a vehicle-to-person (V2P) communication.

10. The method of claim 1, wherein subframes of the network carrier and subframes of the sidelink carrier have different timing references.

11. A computer program product comprised on a non-transitory computer readable storage medium, the computer program product including instructions which, when executed by at least one processor of a wireless terminal, causes the wireless terminal to operate to:
receive a scheduling grant from the radio access network using a network subframe of the network carrier,
obtain a first time measurement relating to the sidelink carrier, wherein the first time measurement is a time measurement of an initial boundary of the measurement sidelink subframe,
obtain a second time measurement relating to the network carrier, wherein the second time measurement is a time measurement of an initial boundary of the network subframe including the scheduling grant, and
select a communication sidelink subframe of the sidelink carrier to be used for a sidelink communication responsive to the scheduling grant, the first time measurement, and the second time measurement, wherein selecting the communication sidelink subframe comprises one of selecting the communication sidelink subframe having a first delay after the measurement sidelink subframe responsive to the first time measurement being less than the second time measurement and selecting the communication sidelink subframe having a second delay after the measurement sidelink subframe responsive to the first time measurement being greater than the second time measurement.

12. A first wireless terminal, UE, adapted to provide network communication with a radio access network using a network carrier and to provide sidelink communication using a sidelink carrier, the first wireless terminal comprising:
a transceiver configured to provide wireless network communication with a radio access network using a network carrier and to provide wireless sidelink communication with a sidelink carrier; and
a processor coupled with the transceiver, wherein the processor is configured to provide wireless network communication and wireless sidelink communication through the transceiver, and wherein the processor is configured to,
receive a scheduling grant from the radio access network using a network subframe of the network carrier,
obtain a first time measurement relating to the sidelink carrier, wherein the first time measurement is a time measurement of an initial boundary of the measurement sidelink subframe,
obtain a second time measurement relating to the network carrier, wherein the second time measurement is a time measurement of an initial boundary of the network subframe including the scheduling grant, and
select a communication sidelink subframe of the sidelink carrier to be used for a sidelink communication responsive to the scheduling grant, the first time measurement, and the second time measurement, wherein selecting the communication sidelink subframe comprises one of selecting the communication sidelink subframe having a first delay after the measurement sidelink subframe responsive to the first time measurement being less than the second time measurement and selecting the communication sidelink subframe having a second delay after the measurement sidelink subframe responsive to the first time measurement being greater than the second time measurement.

13. The first wireless terminal of claim 12 wherein the first time measurement is a time measurement of a boundary of a measurement sidelink subframe, and wherein the second time measurement is a time measurement of a boundary of the network subframe, including the scheduling grant at the first wireless device.

14. The first wireless terminal of claim 13, wherein the processor is configured to,
compare the first and second time measurements, wherein selecting comprises selecting the communication sidelink subframe based on comparing the first and second time measurements.

15. The first wireless terminal of claim 12, wherein the scheduling grant is a first scheduling grant and the communication sidelink subframe is a first communication sidelink subframe, wherein the first scheduling grant is completed during a first reference sidelink subframe, and wherein selecting the first communication sidelink subframe comprises selecting the first communication sidelink subframe having a first delay after the first reference sidelink subframe responsive to the first scheduling grant being completed during a first half of the first reference sidelink subframe, wherein the processor is further configured to,
receive a second scheduling grant from the radio access network using a second network subframe of the network carrier, wherein the second scheduling grant is completed during a second reference sidelink subframe,
obtain a third time measurement relating to the sidelink carrier,
obtain a fourth time measurement relating to the network carrier, and
select a second communication sidelink subframe of the sidelink carrier to be used for a sidelink communication responsive to the second scheduling grant, the third time measurement, and the fourth time measurement, wherein selecting the second communication sidelink subframe comprises selecting the second communication sidelink subframe having a second delay after the second reference sidelink subframe responsive to second scheduling grant being completed during a second half of the second reference sidelink subframe.

16. The first wireless terminal of claim 12, wherein the processor is configured to transmit the sidelink communication using the sidelink subframe of the sidelink carrier after selecting the sidelink subframe.

17. The first wireless terminal of claim 16, wherein transmitting comprises transmitting the sidelink communication from the first wireless terminal to a second wireless terminal using the sidelink subframe of the sidelink carrier so that the sidelink communication is directly terminated between the first and second wireless terminals.

18. The first wireless terminal of claim 12, wherein the network carrier is a Uu carrier.

19. The first wireless terminal of claim 12, wherein the sidelink carrier is a PC5 carrier.

20. The first wireless terminal of claim 12, wherein the wireless terminal is a vehicular wireless terminal, and wherein the sidelink communication comprises at least one of a vehicle-to-vehicle (V2V) communication, or a vehicle-to-person (V2P) communication.

21. The first wireless terminal of claim 12, wherein subframes of the network carrier and subframes of the sidelink carrier have different timing references.

* * * * *